(12) United States Patent
Atarashi et al.

(10) Patent No.: US 7,428,460 B2
(45) Date of Patent: Sep. 23, 2008

(54) METHOD OF DELIVERING DIFFERENCE MAP DATA

(75) Inventors: Yoshitaka Atarashi, Ibaraki (JP);
Yukihiro Kawamata, Ibaraki (JP);
Mariko Okude, Ibaraki (JP); Yukio Miyazaki, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 507 days.

(21) Appl. No.: 11/262,946

(22) Filed: Nov. 1, 2005

(65) Prior Publication Data
US 2006/0095202 A1    May 4, 2006

(30) Foreign Application Priority Data
Nov. 1, 2004    (JP)    ............... 2004-317485

(51) Int. Cl.
*G01C 21/32* (2006.01)
(52) U.S. Cl. ............ 701/208; 701/200; 701/211; 340/995.1
(58) Field of Classification Search ......... 701/200–202, 701/208, 24; 340/995.1
See application file for complete search history.

(56) References Cited

U.S. PATENT DOCUMENTS

| | | | |
|---|---|---|---|
| 6,115,611 A * | 9/2000 | Kimoto et al. | ............ 455/456.3 |
| 6,546,334 B1 * | 4/2003 | Fukuchi et al. | ............ 701/208 |
| 6,829,484 B1 * | 12/2004 | Kimoto et al. | ............ 455/456.1 |
| 7,236,797 B2 * | 6/2007 | Kimoto et al. | ............ 455/456.1 |
| 2008/0033639 A1 * | 2/2008 | Nakamura et al. | ............ 701/208 |

FOREIGN PATENT DOCUMENTS

| | | |
|---|---|---|
| JP | 2002-342330 | 11/2002 |
| JP | 2004-037331 | 2/2004 |

* cited by examiner

*Primary Examiner*—Yonel Beaulieu
(74) *Attorney, Agent, or Firm*—Crowell & Moring LLP

(57) ABSTRACT

The present invention provides, in a car navigation system, a unit of notifying a user of the update contents of map data prior to the downloading of the map data. A vehicle-mounted terminal sets a difference update area in accordance with a selection made by a user and sends a difference update request to a map updating server. If an update mode in this case is "update after outline display", the vehicle-mounted terminal downloads an outline update map from the map updating server. The outline update map is displayed on a display unit of a display. Here, when a download start button displayed on the display unit is depressed, the vehicle-mounted terminal downloads a detailed update map from the map updating server. The detailed update map is then displayed on the display unit of the display. Furthermore, an updating process is performed on the map data stored in a terminal DB.

12 Claims, 23 Drawing Sheets

FIG.3A

DIFFERENCE UPDATE REQUEST FORMAT

| TAG NAME | XML TAG | CONTENT |
|---|---|---|
| UPDATE AREA | Area | CIRCLE (CENTER, RADIUS) OR POLYGON: APEX SERIES OF POLYGON. PLURALITY OF UPDATE AREAS MAY BE SPECIFIED. |
| RECEIVE MODE | Mode | PREVIEW: RECEIVING OF OUTLINE DATA/ DETAIL: RECEIVING OF DETAILED DATA |
| REQUESTED DATA TYPE | Type | MAP: ROAD/BACKGROUND/NAME, POI: POI DATA, ROUTE: GUIDANCE/ROUTE SEARCH. PLURALITY OF REQUESTED DATA TYPES MAY BE DESIGNATED. |
| POI GENRE | POI | THE GENRE TO BE ACQUIRED IS SPECIFIED. A PLURALITY OF POI GENRES MAY BE DESIGNATED. WHEN THE POI GENRE IS OMITTED, ALL GENRES ARE REQUESTED. |
| DIFFERENCE DATA ID | ID | INTEGER (SPECIFIED TO RECEIVE DETAILED DATA AFTER RECEIVING OUTLINE DATA) |

FIG.3B

EXAMPLE OF DIFFERENCE UPDATE REQUEST (RECEIVING OF OUTLINE DATA)

```
<Request>
<Area>
<Circle><Point lat="xxx1" lon="yyy1"/><Radius unit="km">10</Radius></Circle>
<Polygon><Point lat="xxx1" lon="yyy1"/> <Point lat="xxx2" lon="yyy2"/> ... </Polygon>
</Area>
<Mode>Preview</Mode>
<Type>MAP</Type>
<Type>POI</Type>
<POI>GOLF COURSE</POI>
</Request>
```

FIG.3C

EXAMPLE OF DIFFERENCE UPDATE REQUEST (RECEIVING OF DETAILED DATA)

```
<Request>
<ID>100</ID>
<Mode>Detail</Mode>
</Request>
```

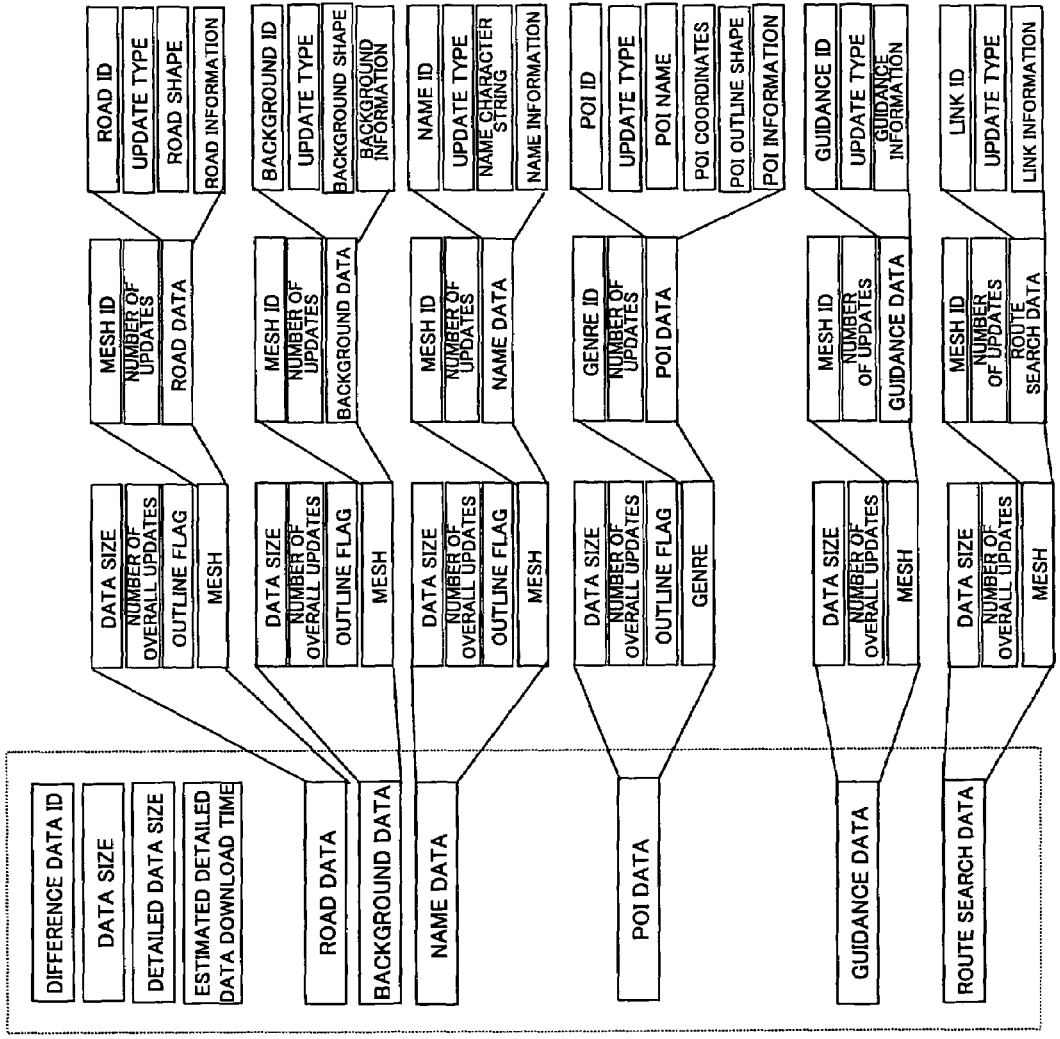
FIG.4 DIFFERENCE MAP DATA FORMAT

FIG.5A

ROAD DATA TABLE

| MESH ID (51) | ROAD ID (52) | ROAD TYPE ID (53) | COORDINATE VALUE SERIES (54) | UPDATE ROAD ID (55) |
|---|---|---|---|---|
| 1000 | 1 | 20 | {(x1,y1),···,(xa,ya)} | 1 |
| 1000 | 2 | 30 | {(x1,y1),···,(xb,yb)} | 2 |
| ... | ... | ... | ... | ... |
| 1001 | 1 | 10 | {(x1,y1),···,(xc,yc)} | 3 |
| 1001 | 2 | 40 | {(x1,y1),···,(xd,yd)} | 4 |
| ... | ... | ... | ... | ... |

FIG.5B

ROAD DATA UPDATE MANAGEMENT TABLE

| UPDATE ROAD ID (55) | ROAD TYPE ID (53) | OUTLINE COORDINATE VALUE SERIES (56) | COORDINATE VALUE SERIES (54) | ROAD NAME (57) | UPDATE DATE/TIME (58) | DELETION DATE/TIME (59) |
|---|---|---|---|---|---|---|
| 1 | 20 | {(x1,y1),···,(xa',ya')} | {(x1,y1),···,(xa,ya)} | "ROOT NO. 16" | 2004/5/5 | |
| 2 | 30 | {(x1,y1),···,(xb',yb')} | {(x1,y1),···,(xb,yb)} | "KANJO NO. 7" | 2003/12/1 | |
| ... | ... | ... | ... | ... | ... | ... |
| 3 | 10 | {(x1,y1),···,(xc',yc')} | {(x1,y1),···,(xc,yc)} | "TOMEI EXPRESSWAY" | 2003/12/1 | |
| 4 | 40 | {(x1,y1),···,(xd',yd')} | {(x1,y1),···,(xd,yd)} | "MEIJI DORI" | 2003/12/1 | |
| ... | ... | ... | ... | ... | ... | ... |

FIG.6B

ROAD DATA UPDATE DATE/TIME TABLE
(VIEW MADE FROM TABLE IN FIGS. 5A AND 5B)

| MESH ID | UPDATE DATE/TIME | DELETION DATE/TIME |
|---|---|---|
| 1000 | 2004/5/5 | |
| ... | ... | ... |
| 1001 | 2003/12/1 | |
| ... | ... | ... |

FIG.6A

ROAD TYPE TABLE

| ROAD TYPE ID | ROAD TYPE |
|---|---|
| 10 | HIGWAY |
| 20 | NATIONAL ROAD |
| 30 | LOCAL ROAD |
| 40 | GENERAL ROAD |
| ... | ... |

FIG.7A

BACKGROUND DATA TABLE

| MESH ID | BACKGROUND ID | BACKGROUND TYPE ID | COORDINATE VALUE SERIES | UPDATE BACKGROUND ID |
|---|---|---|---|---|
| 1000 | 100 | 20 | {(x1,y1),···,(xm,ym)} | 1 |
| 1000 | 200 | 30 | {(x1,y1),···,(xn,yn)} | 2 |
| ... | ... | ... | ... | ... |
| 1001 | 300 | 10 | {(x1,y1),···,(xo,yo)} | 3 |
| 1001 | 400 | 40 | {(x1,y1),···,(xp,yp)} | 4 |
| ... | ... | ... | ... | ... |

FIG.7B

BACKGROUND DATA UPDATE MANAGEMENT TABLE

| UPDATE BACKGROUND ID | BACKGROUND TYPE ID | OUTLINE COORDINATE VALUE SERIES | COORDINATE VALUE SERIES | BACKGROUND NAME | UPDATE DATE/TIME | DELETION DATE/TIME |
|---|---|---|---|---|---|---|
| 1 | 20 | {(x1,y1),···,(xm',ym')} | {(x1,y1),···,(xm,ym)} | "CYUUOU LINE" | 2004/6/30 | |
| 2 | 30 | {(x1,y1),···,(xn',yn')} | {(x1,y1),···,(xn,yn)} | "GREEN PARK" | 2003/12/1 | |
| ... | ... | ... | ... | ... | ... | ... |
| 3 | 10 | {(x1,y1),···,(xo',yo')} | {(x1,y1),···,(xo,yo)} | "OOLAKE" | 2004/3/30 | |
| 4 | 40 | {(x1,y1),···,(xp',yp')} | {(x1,y1),···,(xp,yp)} | "××AIRPORT" | 2003/9/1 | |
| ... | ... | ... | ... | ... | ... | ... |

FIG.8B

BACKGROUND DATA UPDATE DATE/TIME TABLE
(VIEW MADE FROM TABLE IN FIGS. 7A AND 7B)

| MESH ID | UPDATE DATE/TIME | DELETION DATE/TIME |
|---|---|---|
| 1000 | 2004/6/30 | |
| ... | ... | ... |
| 1001 | 2004/3/30 | |
| ... | ... | ... |

FIG.8A

BACKGROUND TYPE TABLE

| BACKGROUND TYPE ID | BACKGROUND TYPE |
|---|---|
| 10 | WATERS |
| 20 | RAILWAY |
| 30 | PARK |
| 40 | AIRPORT |
| ... | ... |

FIG.9

POI DATA TABLE

| POI ID 91 | CATEGORY ID 92 | REGION ID 93 | COORDINATE VALUES 94 | POI NAME 95 | ADDRESS 96 | TELEPHONE NUMBER 97 | UPDATE DATE/TIME 58 | DELETION DATE/TIME 59 | OUTLINE SHAPE 98 | ... |
|---|---|---|---|---|---|---|---|---|---|---|
| 1000 | 200 | 10 | (x11,y111) | ○○BANK | HOKKAIDO ○○CITY A TOWN 1-1 | 012345679 | 2004/5/5 | | (x1,y1)-(x2,y2) | ... |
| 2000 | 300 | 20 | (x12,y12) | RESTAURANT ××  | AOMORIKEN ×× CITY B TOWN 2-2 | 022222222 | 2003/12/1 | | (x3,y3)-(x4,y4) | ... |
| 3000 | 100 | 30 | (x13,y13) | △△DEPARTMENT STORE | AKITAKEN △△ CITY C TOWN 3-3 | 044444444 | 2004/5/5 | | (x5,y5)-(x6,y6) | ... |
| 4000 | 400 | 40 | (x14,y14) | BB BURGER SHOP | IWATEKEN BB CITY D TOWN 4-4 | 055555555 | 2003/12/1 | | (x7,y7)-(x8,y8) | ... |
| ... | ... | ... | ... | ... | ... | ... | ... | ... | ... | ... |

FIG.10A

CATEGORY TABLE

92 — 101

| CATEGORY ID | CATEGORY |
|---|---|
| 100 | BANK |
| 200 | RESTAURANT |
| 300 | DEPARTMENT STORE |
| 400 | FAST FOOD |
| ... | ... |

FIG.10B

REGION TABLE

93 — 102

| REGION ID | REGION |
|---|---|
| 10 | HOKKAIDO |
| 20 | AOMORIKEN |
| 30 | AKITAKEN |
| 40 | IWATEKEN |
| ... | ... |

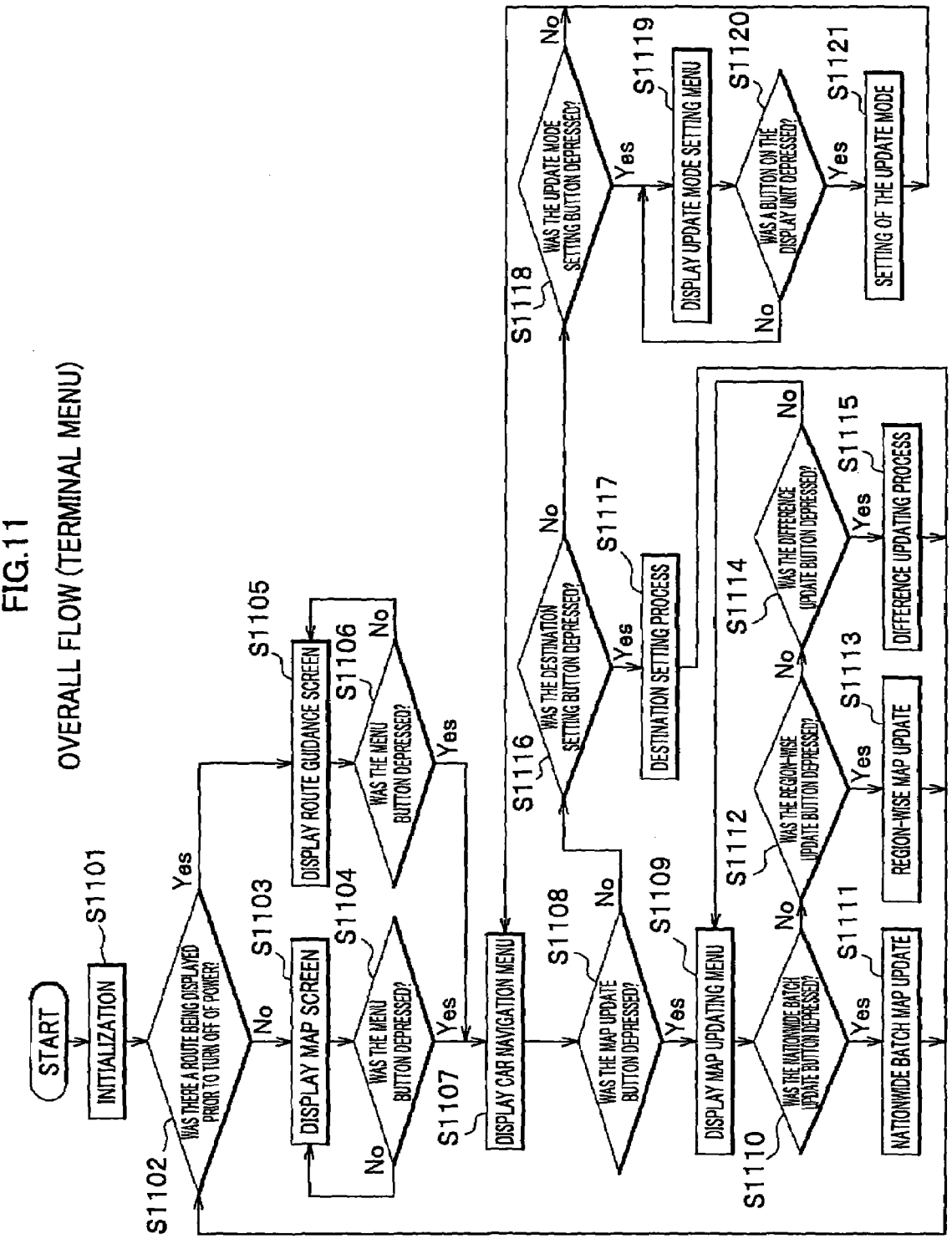
FIG.11 OVERALL FLOW (TERMINAL MENU)

DESTINATION SETTING FLOW

DIFFERENCE DATA SENDING PROCESS

SCREEN DURING A DIFFERENCE UPDATE SEARCH

OUTLINE UPDATE MAP DATA DISPLAY SCREEN

FIG.21A
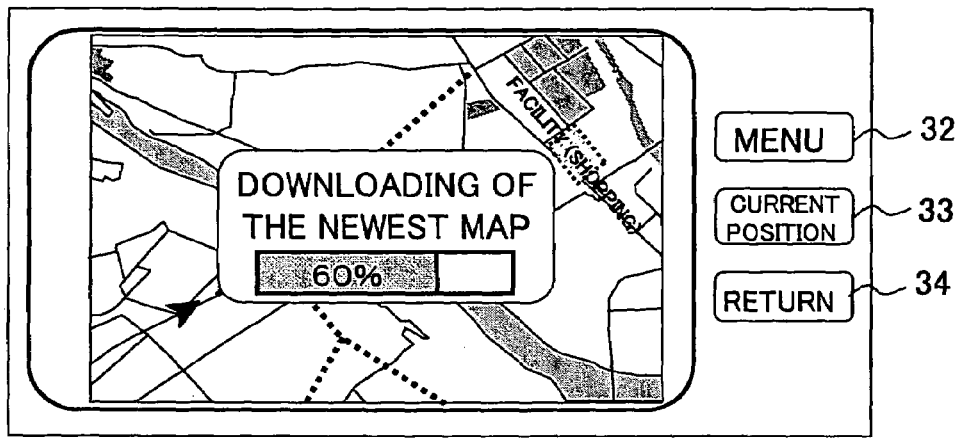
FIG.21B
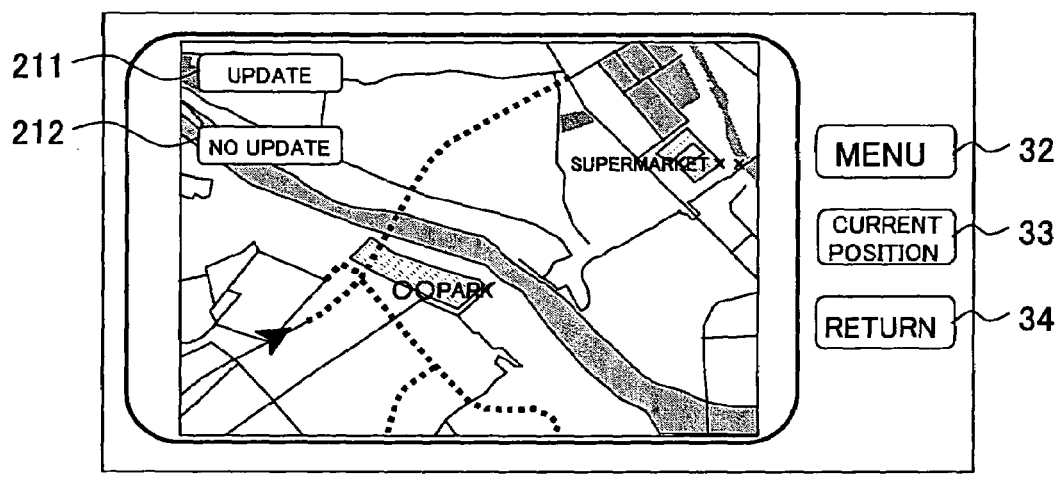
FIG.21C ACTUAL DETAILED UPDATE MAP DATA DISPLAY SCREEN
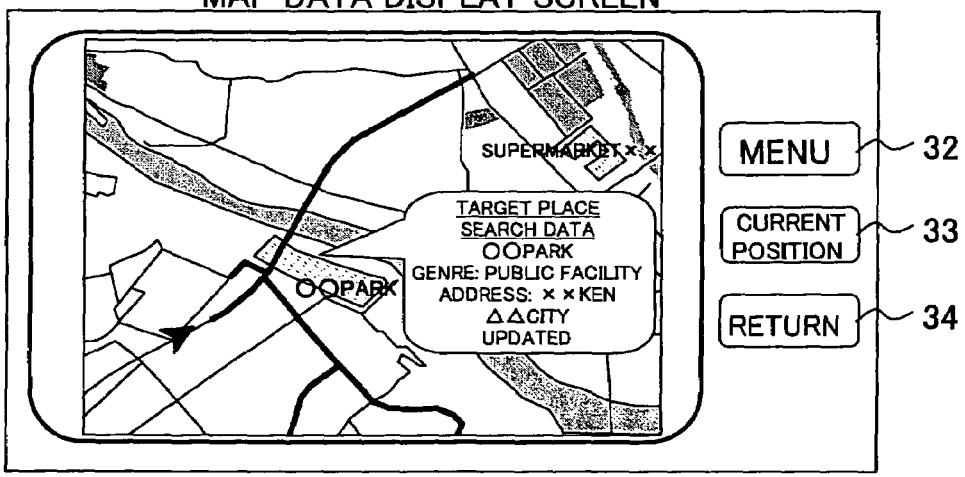

OUTLINE UPDATE MAP DATA DISPLAY SCREEN
(THE ROAD THAT IS ELIMINATED)

ACTUAL DETAILED UPDATE
MAP DATA DISPLAY SCREEN

OUTLINE UPDATE MAP DATA DISPLAY SCREEN
(ROAD TO BE CHANGED)

ACTUAL UPDATE MAP
DATA DISPLAY SCREEN

MAP DISPLAY OF THE VICINITY OF A DESTINATION TARGET AND AN UPDATE REQUEST

OUTLINE DISPLAY OF THE NEWEST DATA

METHOD OF DELIVERING DIFFERENCE MAP DATA

BACKGROUND OF THE INVENTION

1. Field of the Invention

The present invention relates to a method of delivering difference map data in which, upon updating map data via a network in a navigation system, updated portions of the map data are delivered and displayed.

2. Description of the Related Art

Map data, including data on roads, facilities, etc., are stored in car navigation devices installed in vehicles. A car navigation device uses these map data to realize functions of displaying a map of the surroundings of the vehicle position, etc., on a screen and searching for routes to destinations and waypoints indicated by a user. The map data stored in a car navigation device are thus preferably updated constantly to the newest data. However, updating of all of the map data stored at one point in a batch at once will take up considerable amounts of money and time and is not necessarily beneficial to a user.

The updating of just difference data, which, among the map data of the car navigation device, are necessary at one time, has thus been proposed. For example, Japanese Published Unexamined Patent Application No. 2004-37331 (paragraphs 0032 to 0039, FIG. 3 and FIG. 4) discloses a map data delivering system that displays area information corresponding to a predetermined range in the vicinity of a position specified by position data of a vehicle and whereby a user selects, from the area information, an area for which the user desires the delivery of data. Also, Japanese Published Unexamined Patent Application No. 2002-342330 (paragraphs 0048 to 0062, FIGS. 3, 6, and 7) discloses a navigation device that displays a menu screen for downloading the newest map data and whereby a user selects, in accordance with the screen, an area or POI (Point of Interest; a sightseeing spot or any of various facilities) genre for which the user wishes to download data.

However, with the conventional car navigation devices, prior to the downloading of map data, a user knows only the information that data of a predetermined area are going to be updated and does not know what actually in that area will be new or will change (that is, a user cannot preview the update data). The user thus is not sure of the cost and time it takes to download the map data and may feel insecure.

SUMMARY OF THE INVENTION

An aspect of the present invention provides a method of delivering difference map data including the step of notifying a user of update contents prior to the downloading of map data.

Another aspect of the present invention provides a method of delivering difference map data, by which, in a system arranged by a network connection of at least: a terminal, storing map data and displaying the map data; and a server, storing difference data between predetermined map data and the newest map data; the server sends the difference data in response to a request from the terminal, a difference map data delivering method comprising the steps of: the terminal sending to the server a first request message that designates an area of a map to be subject to updating from present map data to newest map data and requests outline difference data that enable outlines of objects to be displayed; the server receiving the first request message and searching a predetermined storage unit for detailed difference data that enable details of the objects in the map area designated by the first request message to be displayed; the server extracting the outline difference data from the searched detailed difference data; the server sending the extracted outline difference data to the terminal; and the terminal receiving the outline difference data and displaying the received outline difference data overlappingly on map data already displayed on a predetermined display unit.

The method of this invention may also comprise, in addition to the respective steps described above, the steps of: the terminal sending to the server a second request message that requests detailed difference data corresponding to the displayed outline difference data; the server receiving the second request message and searching the predetermined storage unit for the detailed difference data; the server sending the searched detailed difference data to the terminal; and the terminal receiving the detailed difference data and on the predetermined display unit, erasing the displayed outline difference data and displaying the received detailed difference data.

The method of this invention may furthermore comprise, in addition to the respective steps described above, the step of: the terminal storing the received detailed difference data in a predetermined storage unit.

With this invention, since the user references the outline difference data at first, the cost and time required for confirming the update contents can be lessened. Since the update contents can be made known in outline prior to downloading the detailed difference data, the user can be made to feel secure.

BRIEF DESCRIPTION OF THE DRAWINGS

The object and features of the present invention will become more readily apparent from the following detailed description taken in conjunction with the accompanying drawings in which:

FIG. 3A shows a difference update request format;

FIG. 3B shows an example of a difference update request (outline request);

FIG. 3C shows an example of a difference update request (detailed request);

FIG. 4 is a diagram showing the format of difference map data according the embodiment;

FIG. 5A shows the arrangement of a road data table;

FIG. 5B shows the arrangement of a road data update management table;

FIG. 6A shows the arrangement of a road type table;

FIG. 6B shows the arrangement of a road data update date/time table;

FIG. 7A shows the arrangement of a background data table;

FIG. 7B shows the arrangement of a background data update management table;

FIG. 8A shows the arrangement of a background type table;

FIG. 8B shows the arrangement of a background data update date/time table;

FIG. 9 is a diagram showing the arrangement of a POI data table according to the embodiment;

FIG. 10A shows the arrangement of a category table;

FIG. 10B shows the arrangement of a region table;

FIG. 11 is a flowchart illustrating the overall operations of the vehicle-mounted terminal according to the embodiment;

FIG. 21A shows a screen during downloading of the newest map according to the embodiment;

FIG. 21B shows a detailed update map data display screen according to the embodiment;

FIG. 21C shows an actual detailed update map data display screen according to the embodiment;

The same or corresponding elements or parts are designated with like references throughout the drawings.

DETAILED DESCRIPTION OF THE INVENTION

A best mode for carrying out this invention shall now be described in detail with reference to the drawings.

<<Arrangement and Outline of the System>>

Figure 1:
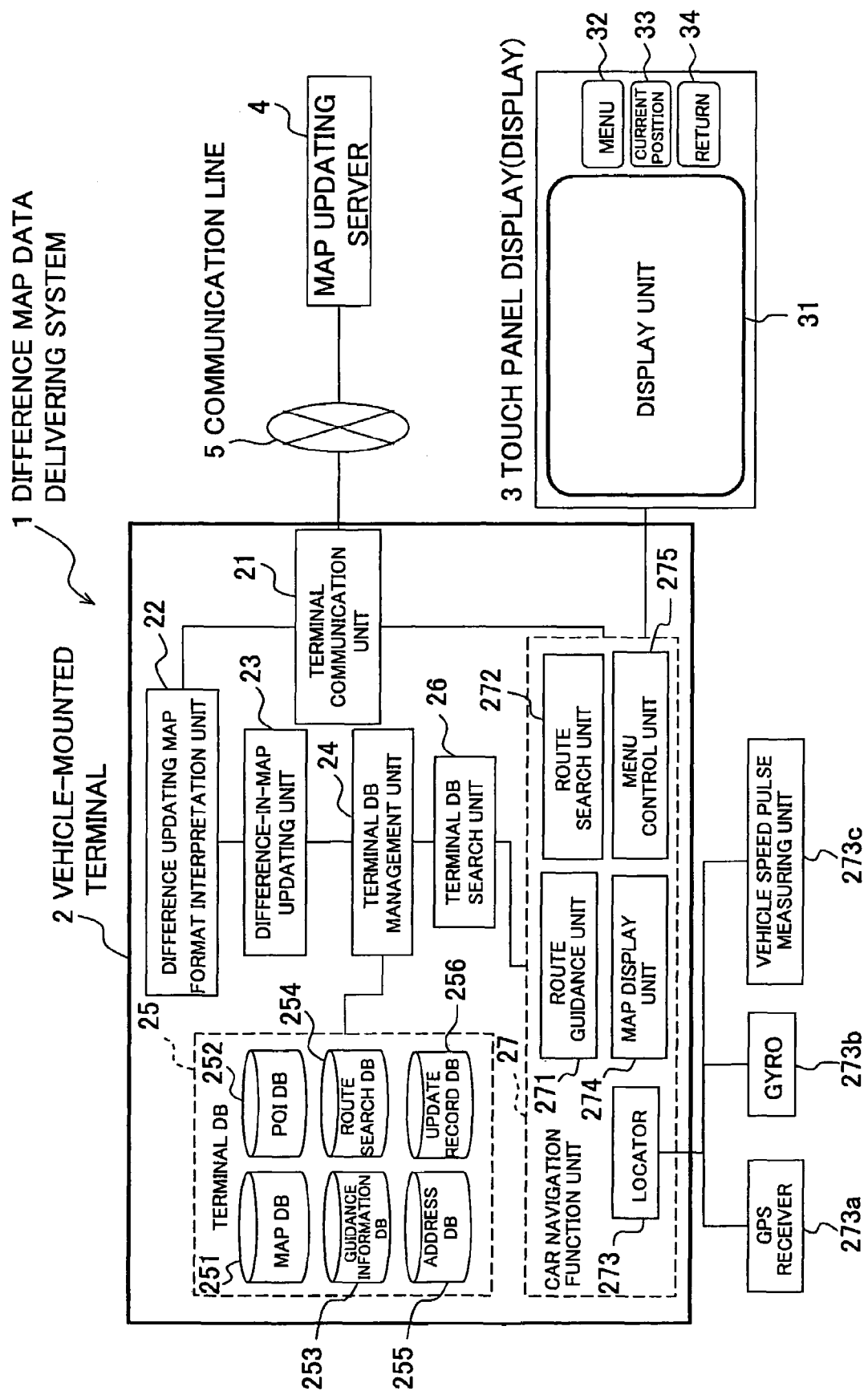
FIG. 1 is a block diagram showing the arrangement of a map data delivering system and a vehicle-mounted terminal according to an embodiment of the present invention.

The arrangement of a map data delivering system of an embodiment of this invention shall now be described with reference to FIG. 1 and FIG. 2. As shown in FIG. 1, a difference map data delivering system 1 is arranged by a vehicle-mounted terminal 2 and a map updating server 4 being connected via a communication line 5. Vehicle-mounted terminal 2 is a car navigation system terminal that is installed on a vehicle and is connected to a touch panel display (referred to hereinafter as "display") 3. Though in FIG. 1, a single vehicle-mounted terminal 2 is shown, in actuality, a plurality of vehicle-mounted terminals 2 may exist that receive delivery of difference map data from map updating server 4. Map updating server 4 is a server that holds difference map data and delivers the data to the respective vehicle-mounted terminals 2. Though in FIG. 1, a single map updating server 4 is shown, a plurality of map updating servers 4 may exist, for example, in correspondence to the types and regional ranges of maps. Communication line 5 is a line that connects vehicle-mounted terminal 2 and map updating server 4 and is realized by a wireless line that connects vehicle-mounted terminal 2 and a wireless station, a dedicated line that connects the wireless station and map updating server 4, etc.

<Arrangement of the Vehicle-Mounted Terminal>

The arrangement of the vehicle-mounted terminal shall now be described with reference to FIG. 1. Vehicle-mounted terminal 2 includes a terminal communication unit 21, a difference updating map format interpretation unit 22, a difference-in-map updating unit 23, a terminal DB management unit 24, a terminal DB 25, a terminal DB search unit 26, a car navigation function unit 27, etc. Terminal communication unit 21 is connected to communication line 5, serves a communication function in vehicle-mounted terminal 2, and is specifically realized by a wireless line connection device, etc. Difference updating map format interpretation unit 22 inputs difference map data that terminal communication unit 21 receive from map updating server 4 via communication line 5 and interprets the difference updating map format of the input difference map data. Specifically, since the difference map data are converted from a DB format in map updating server 4 to an XML (Extensible Markup Language) format or binary format for data communication, difference updating map format interpretation unit 22 reconverts the data to the original format, interprets the contents of the difference map data, and expands the data into a format for storage in terminal DB 25. Difference-in-map updating unit 23 makes the difference-in-map data expanded by difference updating map format interpretation unit 22 be stored in a map DB 251 of terminal DB 25. Actually, difference-in-map updating unit 23 issues, to terminal DB management unit 24, an instruction to store the difference map data. Upon receiving instructions from difference-in-map updating unit 23 and terminal DB search unit 26, terminal DB management unit 24 searches or reads data stored in the respective DB's of terminal DB 25 or writes data in the respective DB's. Terminal DB management unit 24 is realized by a so-called DB management system.

Terminal DB 25 is a set of DB's used by vehicle-mounted terminal 25 and is realized by the storage of DB software and data structures in a storage device. Terminal DB 25 comprises map DB 251, a POI DB 252, a guidance information DB 253, a route search DB 254, an address DB 255, and an update record DB 256. Data on roads, backgrounds, the names of roads and backgrounds, etc., are stored in map DB 251. Data on sightseeing spots and various facilities are stored in POI DB 252. Information used by a route guidance unit 271 of car navigation function unit 27 is stored in guidance information DB 253. Information used by route search unit 272 of car navigation function unit 27 is stored in route search DB 254. Systematic data concerning addresses used in various types of searches by address designation are stored in address DB 255. An update date/time table, which indicates the dates and times at which the respective data have been updated, is stored in update record DB 256. Each DB is arranged so that by specifying conditions concerning the data stored therein, the corresponding data can be searched.

The storage device that realizes terminal DB 25 may be an arrangement comprising, for example, a DVD (Digital Versatile Disk) that stores original map data or an SD (Secure Digital) memory card that stores difference map data, etc. A hard disk device storing original map data and difference map data together may also be used. Here, a specialized DB for car navigation or a general DB may be applied.

Terminal DB search unit 26 receives, from car navigation function unit 27, an instruction for searching terminal DB 25 under predetermined conditions and issues the instruction to terminal DB management unit 24 upon expanding the instruction to a format interpretable by the DB management system. Car navigation function unit 27 serves so-called car navigation functions in linkage with display 3.

Car navigation function unit 27 comprises a route guidance unit 271, a route search unit 272, a locator 273, a map display unit 274, and a menu control unit 275. When a route to a destination is specified, route guidance unit 271 performs a guidance display on display 3 so that the destination can be reached in accordance with the route. When a destination has been determined, route search unit 272 extracts a plurality of routes from the current position of the vehicle to the destination and selects the optimal route from among those routes.

Locator 273 is a unit for ascertaining the current position, traveling speed, etc., of the vehicle and is connected to a GPS receiver 273a, a gyro 273b, a vehicle speed pulse measuring unit 273c, etc. GPS receiver 273a is used to determine the current position of the vehicle. Gyro 273b is used to measure the yaw rate (angular velocity in the front/rear direction). Vehicle speed pulse measuring unit 273c is used to measure the traveling speed of the vehicle.

Map display unit 274 reads various map data from map DB 251 or POI DB 252 of terminal DB 25 and makes the data be displayed on a display unit 31 of display 3. Menu control unit 275 makes a car navigation menu, map upgrading menu, and other menus be displayed on display 3, makes a subsequent menu be displayed in accordance with a menu selection made by the user, and makes a map be displayed by map display unit 274. Menu control unit 275 also keeps and manages the screen data of the respective menus in a predetermined memory.

Difference updating map format interpretation unit 22, difference-in-map updating unit 23, terminal DB management unit 24, terminal DB search unit 26, and car navigation function unit 27 are realized by a CPU executing programs stored in a predetermined memory incorporated in vehicle-mounted terminal 2.

Display 3 has display unit 31, a menu button 32, a current position button 33, and a return button 34. Display unit 31 is the screen on which map data and menus are displayed. Menu button 32 is a button that is used when a car navigation menu (see FIG. 16) is to be displayed. Current position button 33 is a button that is used when the current position of the vehicle on a map is to be displayed. Return button 34 is a button that is used to return to a screen that was displayed one step priory.

<Arrangement of the Map Updating Server>

The arrangement of the map updating server 4 shall now be described with reference to FIG. 2. Map updating server 4 comprises a server communication unit 41, a difference-in-map search unit 42, an updating DB management unit 43, an updating DB 44, a difference updating map format conversion unit 45, etc. Server communication unit 41 is connected to communication line 5, serves a communication connection function in map updating server 4, and is specifically realized by a network connection device, etc. Difference-in-map search unit 42 inputs difference update request data that server communication unit 41 has received from vehicle-mounted terminal 2 via communication line 5 and performs a search of map data based on the difference update request data that have been input. Specifically, since the difference update request data indicate a range on a map and data types that have been converted to the XML format or binary format for data communication, the data are reconverted to the original format and expanded into map data search conditions. Updating DB management unit 43 inputs the map data search conditions expanded by difference-in-map search unit 42 and searches the respective DB's of updating DB 44 in accordance with the search conditions. Updating DB management unit 43 is realized by a so-called DB management system.

Updating DB 44 is a set of DB's used in map updating server 4 and is realized by DB software and data being stored in a hard disk device, etc. Updating DB 44 comprises an updating map DB 441, an updating POI DB 442, an updating guidance information DB 443, an updating route search DB 444, an updating address DB 445, and a vehicle-mounted terminal management DB 446. Difference data for updating the data of the respective DB's of vehicle-mounted terminal 2 are stored in the respective updating DB's 441 to 445. The addresses, etc., of terminals to which the corresponding map updating server 4 is to deliver map data, are stored in vehicle-mounted terminal management DB 446. Difference updating map format conversion unit 45 inputs the difference data that have been searched by updating DB management unit 43 and converts the difference data to the XML format, binary format, or other format, and then outputs the difference data after format conversion to server communication unit 41. Server communication unit 41 then sends the input difference data to vehicle-mounted terminal 2 via communication line 5.

<<Data Configuration>>

The configuration of the data handled by the map data delivering system according to the embodiment shall now be described with reference to FIG. 3 to FIG. 10.

<Data Concerning the Difference Update Request>

FIG. 3 shows XML data that are used when a difference update request is made to the map updating server by the vehicle-mounted terminal. The difference update request data are issued at the point in time at which the range (surroundings of the current position, etc.) to be subject to difference updating is specified in a difference updating menu (see FIG. 18) that is displayed on display unit 31 of display 3.

FIG. 3A shows XML tags and data that are mainly used in the difference update request format. The main tag names include "update area," "receive mode," "requested data type," "POI genre (PIO category)," "difference data ID," etc. The update area is the range to be subject to difference updating and uses the tag, "Area." Furthermore, for designation of the update area, the tag, "Circle," is used to designate the range by a circle, or the tag, "Polygon," is used to designate the range using a polygon. A plurality of update areas may be designated. The receive mode is the mode used for receiving the difference data and uses the tag, "Mode." When the receiving of outline data is to be designated as the receive mode, the data, "Preview," is set, and when the receiving of detailed data is to be designated, the data, "Detail," is set.

The requested data type designates the type of data for which the difference update request is to be made and uses the tag, "Type." The requested data types include "MAP," which indicates roads, backgrounds, and names, "POI," which indicates POI data, "ROUTE," which indicates guidance and route search. A plurality of requested data types may be designated. The POI genre designates the genre of the POI for which difference data are desired to be acquired and uses the tag, "POI." A plurality of POI genres may be designated. When the POI genre designation is omitted, it is deemed that all genres are being requested. The difference data ID is an integer that is designated for the vehicle-mounted terminal 2 to perform the receiving of detailed difference data after the receiving of outline difference data and uses the tag, "ID." Specifically, this is a number that is unique to the difference data (at least one type of data among MAP, POI, and ROUTE) that are sent from map updating server 4 in response to a single difference update request.

FIG. 3B shows an example (XML description example) of a difference update request for the receiving of outline data. Here, for the designation of an update area by a circle, "lat" (the latitude) and "lon" (the longitude) of a "Point" (the center of the circle) are set as "xxx1" and "yyy1," respectively. Also, "unit" (the unit) of "Radius" (the radius of the circle) is set to "km" and the data thereof is set to "10." Meanwhile for the designation of an update area by a polygon, a point, with which "lat" is "xxx1" and "lon" is "yyy1," a point, with which "lat" is "xxx2" and "lon" is "yyy2," etc., are set. "Preview" (receiving of outline data) is set as the receive mode. "MAP" and "POI" are then set as the requested data types, and "golf course" is set as the POI genre.

FIG. 3C shows an example (XML description example) of a difference update request for the receiving of detailed data. The data, "100," is set as the difference data ID. "Detail" is set as the receiving mode. Though this example illustrates the case where the difference data ID for a previous receiving of outline data is used for the difference update request for receiving detailed data, specific conditions may be set instead as shown in FIG. 3B.

FIG. 4 shows a format of difference map data sent from the map updating server 4. Though the difference map data format is illustrated as a hierarchical structure in FIG. 4, in actuality, it is realized by XML tags and data. The respective items shown in FIG. 4 thus correspond to being XML tag names. "Difference data ID" indicates a number unique to the difference data sent from map updating server 4. "Data size" indicates the size of outline data. "Detailed data size" indicates the size of detailed data corresponding to the outline data. "Estimated detailed data download time" indicates the estimated value of the time it takes to download detailed data. "Road data" indicates data concerning roads. "Background data" indicates data concerning backgrounds. "Name data" indicates data concerning names of roads and backgrounds. "POI" indicates data concerning sightseeing spots and various facilities. "Guidance data" indicates data concerning guidance to a destination. "Route search data" indicates data concerning the searching of a route to the destination. An outline flag is included in the road data, background data, name data, and POI data. This outline flag indicates whether or not the corresponding data are outline difference data. That is, when an outline flag is ON, it indicates that the corresponding data are outline difference data, and when an outline flag is OFF, it indicates that the corresponding data are detailed difference data. Detailed description of the other data shall be omitted.

<Tables Concerning Road Data>

FIG. 5A shows a road data table and FIG. 5B shows a road data update management table. They are stored in updating map DB 441 of map updating server 4. As shown in FIG. 5A, the road data table holds data comprising a mesh ID 51, a road ID 52, a road type ID 53, a coordinate value series 54, update road ID 55, etc. Mesh ID 51 is a number that uniquely indicates a mesh among meshes that are formed as rectangular areas when a map is divided in a lattice-like manner. Road ID 52 is a number unique to a road in the corresponding mesh. Thus even with a single connected road, portions thereof may not be the same in road ID 52 if they belong to meshes of different mesh ID 51. Road type ID 53 is a number unique to the type of road that indicates that a road is a highway, a general road, etc. The details shall be given later. Coordinate value series 54 indicates the coordinate values of the positions of the respective ends of segments that are deemed to form a road upon being connected. Update road ID 55 indicates a road number unique to the road data update management table when an update is made concerning a road specified by the corresponding road ID. For example, "Update road ID 55=1" for "Mesh ID 51=1000, Road ID 52=1" in the road data table corresponds to "Update road ID 55=1" in the road data update management table.

As shown in FIG. 5B, the road data update management table holds data comprising update road ID 55, road type ID 53, an outline coordinate value series 56, coordinate value series 54, a road name 57, an update date/time 58, a deletion date/time 59, etc. Here, description of the contents described with reference to FIG. 5A shall be omitted. As with coordinate value series 54, outline coordinate value series 56 indicates the coordinate values of the positions of the respective ends of segments that are deemed to form a road upon being connected. Due to being those of an "outline," the number of coordinate values of outline coordinate value series 56 will be less than the number of coordinate values of coordinate value series 54. Road name 57 indicates the name of the corresponding road. This road name 57 is displayed supplementarily when road data are displayed on display unit 31 of display 3. Update date/time 58 indicates the date and time at which the corresponding road data were added to the road data update management table. This date and time thus correspond to being the date and time at which the original road data in the road data table were "updated." Deletion date/time 59 indicates the date and time at which the corresponding road data were deleted.

In continuation to FIG. 5, FIG. 6 shows the arrangements of tables concerning road data. A road type table, shown in FIG. 6A, is stored in updating map DB 441 of map updating server 4 and indicates the correspondence between the road type ID, which is a component of each of the tables of FIG. 5, and the road type. For example, when road type ID 53 is "10," its road type 61 is "highway." A road data update date/time table, shown in FIG. 6B, is stored in updating map DB 441 of map updating server 4 and records the update date/time at which road data were added and the deletion date/time at which road data were deleted according to mesh ID. For example, "2004/5/5" is set as an update date/time 58 for "mesh ID 51=1000." This setting is made based on the road data table of FIG. 5A and the road data update management table of FIG. 5B. That is, when data, with which update road ID 55 is "1," is added to the road data update management table, the road data table is referenced and it is recorded that updating was carried out for the mesh of "mesh ID 51=1000," to which the road belongs, on "update date/time 58=2004/5/5" for that road.

<Tables Concerning Background Data>

A background data table, shown in FIG. 7A, and a background data update management table, shown in FIG. 7B, are stored in updating map DB 441 of map updating server 4. As shown in FIG. 7A, the background data table holds data comprising mesh ID 51, a background ID 71, a background type ID 72, coordinate value series 54, update background ID 73, etc. Mesh ID 51 is a number that uniquely indicates a mesh among meshes that are formed as rectangular areas when a map is divided in a lattice-like manner. Background ID 71 is a number unique to a background in the corresponding mesh. Thus even with a single connected background, portions thereof may not be the same in background ID 71 if they belong to meshes of different mesh ID. Background type ID 72 is a number unique to the type of background that indicates that a background is a body of water, an airport, etc. The details shall be given later. Coordinate value series 54 indicates the coordinate values of the positions of the respective ends of segments (edges) that are deemed to surround a background upon being connected (as a polygon). Update background ID 73 indicates a background number unique to the background data update management table when an update is made concerning a background specified by the corresponding background ID 71. For example, "Update background ID 73=1" for "Mesh ID 51=1000, Background ID 71=100" in the background data table corresponds to "Update background ID 73=1" in the background data update management table.

As shown in FIG. 7B, the background data update management table holds data comprising update background ID 73, background type ID 72, outline coordinate value series 56, coordinate value series 54, a background name 74, update date/time 58, deletion date/time 59, etc. Here, description of the contents described with reference to FIG. 7A shall be omitted. As with coordinate value series 54, outline coordinate value series 56 indicates the coordinate values of the positions of the respective ends of segments that are deemed to surround a background upon being connected. Due to being those of an "outline," the number of coordinate values of outline coordinate value series 56 will be less than the number of coordinate values of coordinate value series 54. Background name 74 indicates the name of the corresponding background. This background name 74 is displayed supplementarily when background data are displayed on display unit 31 of display 3. Update date/time 58 indicates the date and time at which the corresponding background data were added to the background data update management table. This date and time thus correspond to being the date and time at which the original background data in the background data table were "updated." Deletion date/time 59 indicates the date and time at which the corresponding background data were deleted.

A background type table, shown in FIG. 8A, is stored in updating map DB 441 of map updating server 4 and indicates the correspondence between the background type ID, which is one component of each of the tables of FIG. 7A and FIG. 7B, and the background type. For example, when background type ID 72 is "10," its background type 81 is "waters." A background data update date/time table, shown in FIG. 8B, is stored in updating map DB 441 of map updating server 4 and records the update date/time at which background data were added and the deletion date/time at which background data were deleted according to mesh ID. For example, "2004/6/30" is set as update date/time 58 for "mesh ID 51=1000." This setting is made based on the background data table of FIG. 7A and the background data update management table of FIG. 7B. That is, when data, with which update background ID 73 is "1" is added to the background data update management table, the background data table is referenced and it is recorded that updating was carried out for the mesh of "mesh ID 51=1000," to which the background belongs, on "update date/time 58=2004/6/30" for that background.

<Tables Concerning POI Data>

FIG. 9 shows the arrangement of a POI data table. The POI data table is stored in updating POI DB 442 of map updating server 4. As shown in FIG. 9, the POI data table holds data comprising a POI ID 91, a category ID 92, a region ID 93, coordinate values 94, a POI name 95, an address 96, a telephone number 97, update date/time 58, deletion date/time 59, an outline shape 98, etc. POI ID 91 is a number unique to a POI. Category ID 92 is a number unique to a category, such as a bank, fast food restaurant, etc., to which the POI belongs. Region ID 93 is a number unique to a region, such as Hokkaido, Iwate Prefecture, etc., to which the POI belongs. Coordinate values 94 are the coordinate values of the central position of the POI on a map, and for example, a combination of latitude and longitude is used. POI name 95 is the name of the POI. Address 96 is the current address of the POI. Telephone number 97 is the telephone number used to contact the POI. Update date/time 58 indicates the date and time at which the data concerning the POI were updated. Deletion date/time 59 indicates the date and time at which the data concerning the POI were deleted. Outline shape 98 indicates a rectangle that expresses the outline of the POI, and specifically comprises the coordinates of two opposing vertices of the rectangle.

A category table, shown in FIG. 10A, and a region table, shown in FIG. 10B, are stored in updating POI DB 442 of map updating server 4. The category table of FIG. 10A indicates the correspondence between a category ID, which is a component of the POI data table of FIG. 9, and a category. For example, when category ID 92 is "100," its category 101 is a "bank." The region table of FIG. 10B indicates the correspondence between a region ID, which is a component of the POI data table of FIG. 9, and a region. For example, when region ID 93 is "10," its region 102 is "Hokkaido."

<<Operations of the System>>

The operations of the map data delivering system according to the embodiment shall now be described with reference to the flowcharts of FIG. 11 to FIG. 15 and the screens of FIG. 16 to FIG. 27 (and with reference to FIG. 1 to FIG. 10 where necessary).

<Overall Operations of the Vehicle-Mounted Terminal>

FIG. 11 shows the overall operations of the vehicle-mounted terminal. When vehicle-mounted terminal 2 is started up by the turning on of power, data and tables in a memory are initialized (S1101). A non-volatile memory that stores states prior to the turning off of power is then referenced to check whether or not there was a route that was being displayed prior to the turning off of power (S1102). If no route was displayed (No in S1102), a map screen is displayed (S1103). Specifically, map display unit 274 reads road data, background data, and name data that are stored in map DB 251 and POI data that are stored in POI DB 252 and makes the read data be displayed on display unit 31. And as long as menu button 32 at the right side of display 3 is not depressed (No in S1104), the display of the map screen is continued (S1103). When menu button 32 is depressed (Yes in S1104), processing proceeds to step S1107. Meanwhile, if there was a route that was being displayed prior to the turning off of power (Yes in S1102), a route guidance screen is displayed (S1105). Specifically, route guidance unit 271 reads guidance information from guidance information DB 253 and makes the read guidance information be displayed on display unit 31. Here, map display unit 274 makes the map data of map DB 251 and POI DB 252 be displayed in a manner by which the user can be guided readily. For example, a normal road display may be carried out during a normal state and when an intersection is approached, a display with which the vicinity of the intersection is enlarged and the direction in which to proceed is made more readily understood may be carried out. Then as long as menu button 32 of display 3 is not depressed (No in S1106), the display of the route guidance screen is continued (S1105).

When menu button 32 is depressed (Yes in S1106), processing proceeds to step S1107. It shall be deemed here that the judgment of whether or not menu button 32 was depressed is made by checking the ON/OFF of a signal line, among signal lines connected from display 3 to vehicle-mounted terminal 2, that corresponds to menu button 32. The same applies to the other buttons and to the buttons displayed in the respective screens.

Figure 16:
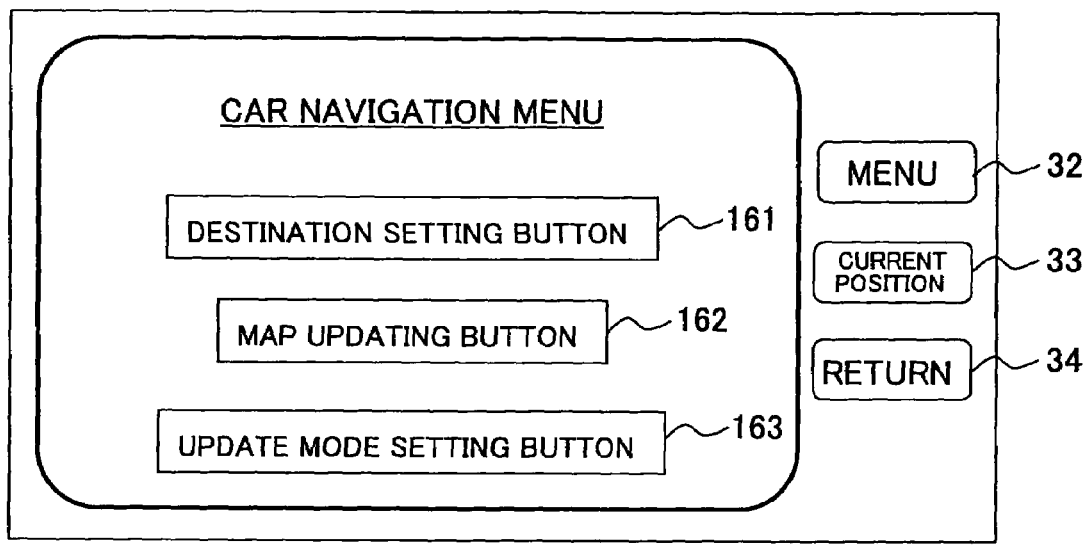
FIG. 16 is a diagram showing a car navigation menu according to the embodiment.

In step S1107, the car navigation menu is displayed. Specifically, when menu control unit 275 detects the depressing of menu button 32, it makes the car navigation menu be displayed on display unit 31. As shown in FIG. 16, in the car navigation menu, a destination setting button 161, a map updating button 162, and an update mode setting button 163 are displayed. Destination setting button 161 is a button for setting a destination to which the vehicle is to proceed from now. Map updating button 162 is a button for updating the map data stored in map DB 251 and POI DB 252. Update mode setting button 163 is a button for setting the mode of updating the map data by map updating button 162. Menu control unit 275 then checks whether or not map updating button 162 of the car navigation menu was depressed (S1108). If this button was depressed (Yes in S1108), a map updating menu is displayed on display unit 31 (S1109).

Figure 17:
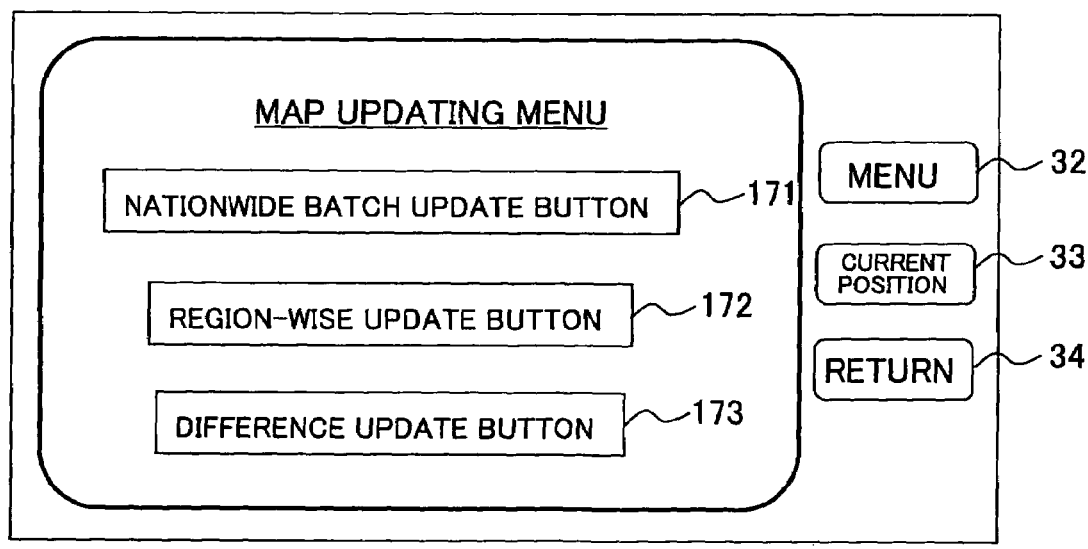
FIG. 17 is a diagram showing a map updating menu according to the embodiment.

As shown in FIG. 17, a nationwide batch update button 171, a region-wise update button 172, and a difference update button 173 are displayed in the map updating menu. Nationwide batch update button 171 is a button for updating the map data in map DB 251 and POI DB 252 for an entire nation in a batch. Region-wise update button 172 is a button for updating the map data according to region. Difference update button 173 is a button for updating the map data upon designation of a limited, predetermined area. Menu control unit. 275 checks whether or not nationwide batch update button 171 was depressed (S1110). If this button was depressed (Yes in S1110), a nationwide batch map update is carried out (S1111). S1102 is then returned to. If nationwide batch update button 171 has not been depressed (No in S1110), whether or not region-wise update button 172 was depressed is checked (S1112). If this button was depressed (Yes in S1112), a region-wise map update is carried out (S1113). S1102 is then returned to. If region-wise update button 172 has not been depressed (No in S1112), whether or not difference update button 173 was depressed is checked (S1114). If this button was depressed, (Yes in S1114), a difference updating process is carried out (S1115). The details of this process shall be described later. Thereafter, S1102 is returned to. If difference update button 173 has not been depressed (No in S1114), a return to S1109 is carried out. That is, as long as a button of the map updating menu is not depressed, the display of the menu is continued.

If in step S1108, map update button 162 of the car navigation menu has not been depressed (No in S1108), whether or not destination setting button 161 was depressed is checked (S1116). If this button was depressed (Yes in S1116), a destination setting process is carried out (S1117). The details thereof shall be described later. Thereafter, S1102 is returned to. If destination setting button 161 has not been depressed (No in S1116), whether or not update mode setting button 163 was depressed is checked (S1118).

Figure 19:
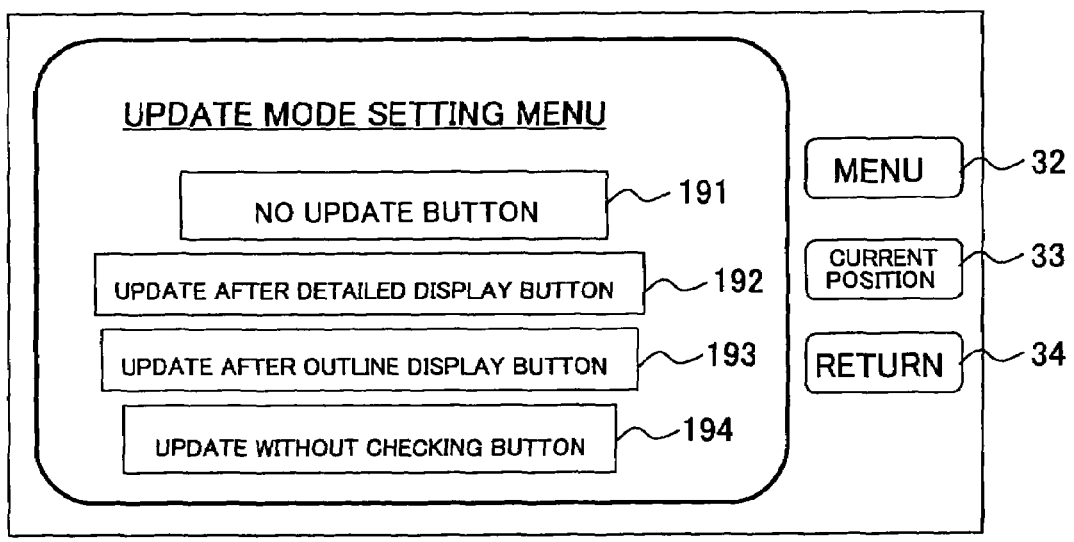
FIG. 19 is a diagram showing an update mode setting menu according to the embodiment.

If this button was depressed (Yes in S1118), an update mode setting menu is displayed on display unit 31 (S1119). As shown in FIG. 19, a no update button 191, an update after detailed display button 192, an update after outline display button 193, and an update without checking button 194 are displayed in the update mode setting menu. No update button 191 is a button with which the updating of map data will not be performed. Update after detailed display button 192 is a button with which the details of the update contents of the map data are displayed once and update is carried after checking these contents. Update after outline display button 193 is a button with which the outlines of the update contents of the map data are displayed once and update is carried after checking these contents. Update without checking button 194 is a button with which updating is performed without display and checking of the update contents of the map data. Whether or not any of the buttons of display unit 31, on which the update mode setting menu is displayed, was depressed is then checked (S1120). If a button was depressed (Yes in S1120), the setting of the update mode is carried out (S1121). Specifically, menu control unit 275 stores the update mode corresponding to the depressed button in a predetermined memory inside vehicle-mounted terminal 2. Thereafter, the process returns to step S1107. If a button has not been depressed (No in S1120), the process returns to step S1119. Thus as long as there is no depression of a button of the update mode setting menu, the display of the update mode setting menu is continued. The setting of the update mode in the update mode setting menu is effective not only for the difference updating process but also for the destination setting process.

If in step S1118, update mode setting button 163 of the car navigation menu has not been depressed (No in S1118), the process returns to step S1107. Thus as long as a button of the car navigation menu is not depressed, the display of the car navigation menu is continued.

<Difference Updating Operations of the Vehicle-Mounted Terminal>

Figure 12:
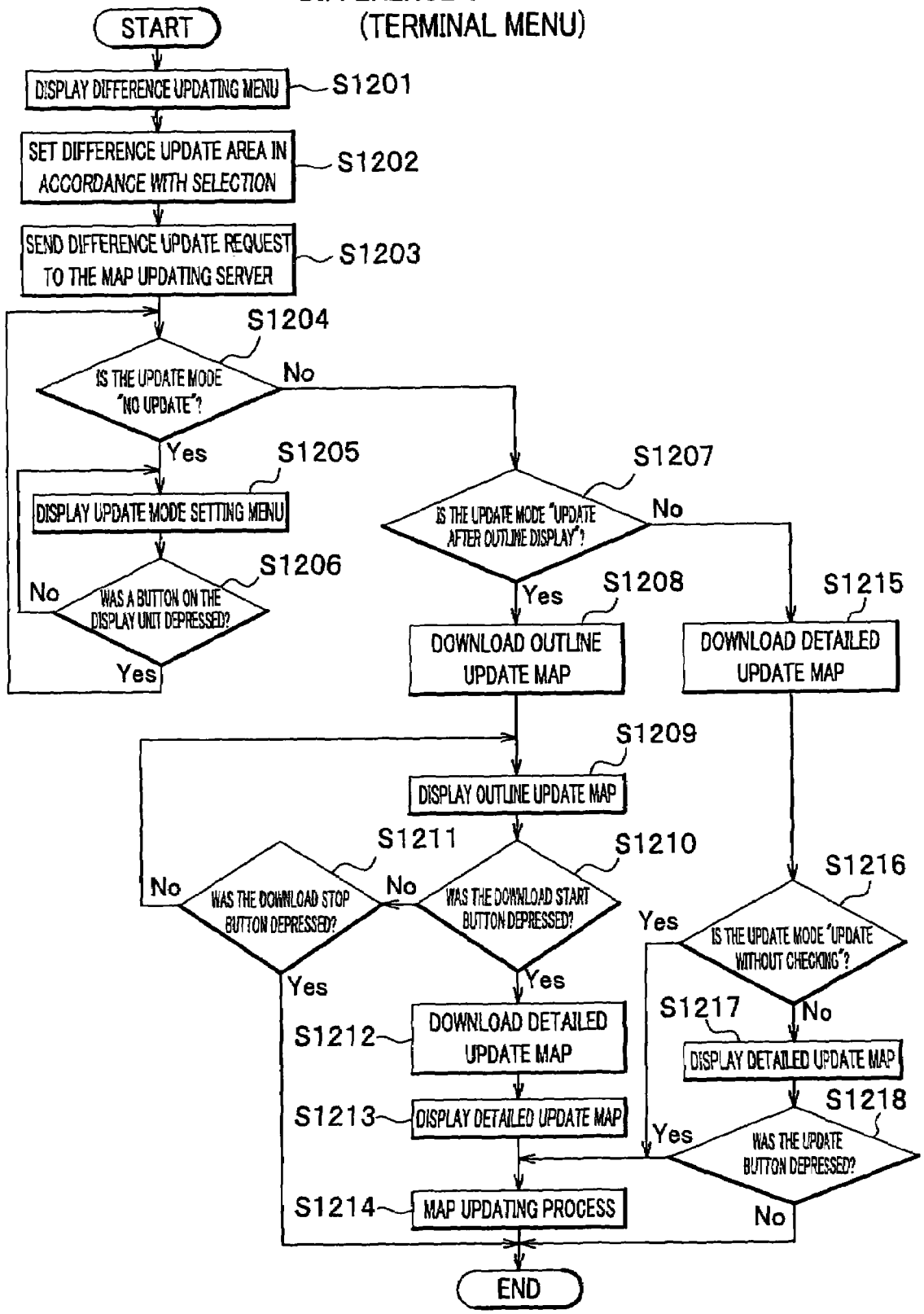
FIG. 12 is a flowchart illustrating a difference updating process of the vehicle-mounted terminal according to the embodiment.
Figure 18:
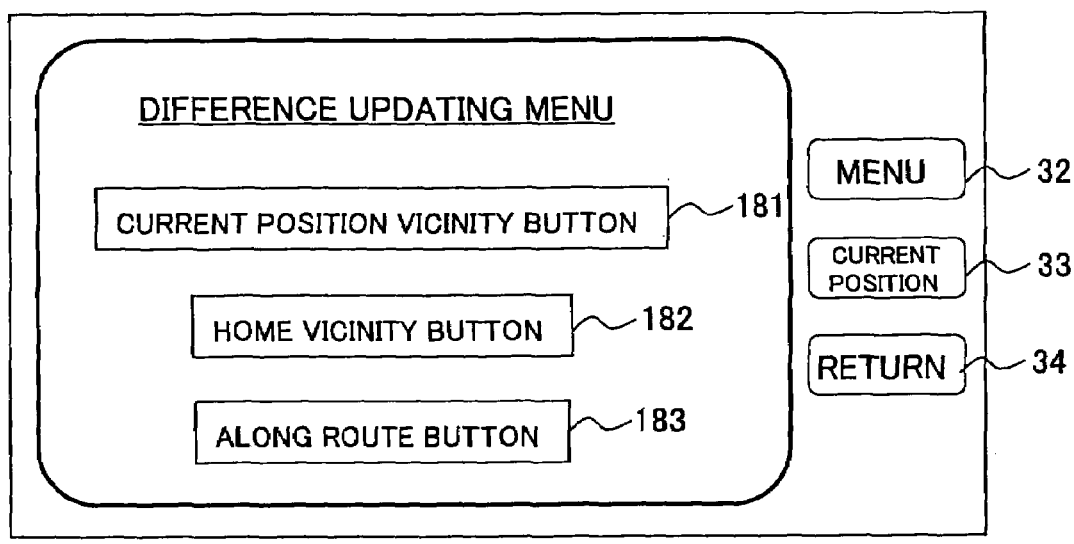
FIG. 18 is a diagram showing a difference updating menu according to the embodiment.

FIG. 12 illustrates the difference updating operations of the vehicle-mounted terminal. Step S1115 in FIG. 11 is hereby illustrated in detail. When in step S1114 of FIG. 11, difference update button 173 of the map updating menu of FIG. 17 is depressed, menu control unit 275 makes the difference updating menu be displayed on display unit 31 of display 3 (S1201) as the start of the difference updating process (S1115). As shown in FIG. 18, a current position vicinity button 181, a home vicinity button 182, and an along route button 183 are displayed in the difference updating menu. This difference updating menu enables a user to select, in a general manner, an area, which the user wishes to be subject to the difference update. Current position vicinity button 181 is a button with which the vicinity of the current position of the user is selected as the area. Home vicinity button 182 is a button with which the vicinity of the user's home is selected as the area. Along route button 183 is a button with which an area along the route from the current position to a destination is selected as the area. When the user depresses any of these buttons, the update area of the difference update request format is set in accordance with the selection (S1202). Specifically, data, which designate the area corresponding to any of current position vicinity button 181, home vicinity button 182, and along route button 183 by a circle or a polygon, are prepared. A difference update request (first request message), in which the update area is designated by the prepared data, is then sent to map updating server 4 (S1203).

Menu control unit 275 then checks whether or not the update mode is "no update" (S1204). If the update mode is "no update" (Yes in S1204), the update mode setting menu (see FIG. 19) is displayed on display unit 31 (S1205) and whether or not a button on display unit 31 was depressed is checked periodically (S1206). When a button is depressed (Yes in S1206), the process returns to step S1204 and the update mode is checked (S1204). As long as a button is not depressed (No in S1206), the process returns to step S1205 and the display of the update mode setting menu is continued (S1205). Though since the difference updating menu is displayed by a selection operation by the user (S1201), it may be considered that the check of whether the update mode is "no update" (S1204) is unnecessary, a check is carried out to accommodate for the case where the update mode is not set.

Figure 20A:
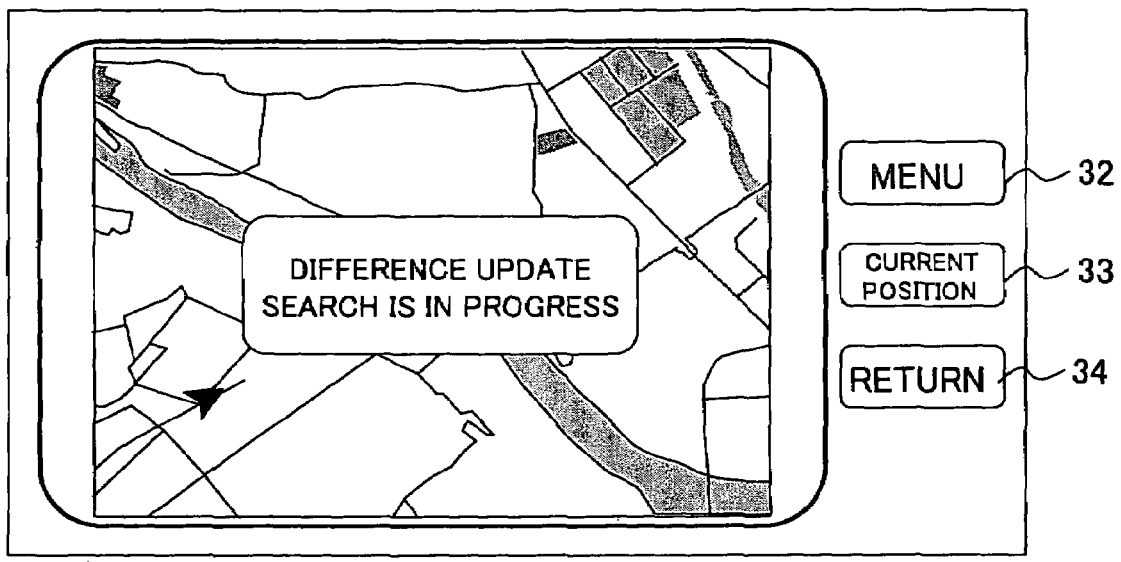
FIG. 20A shows a screen during a difference update search according to the embodiment.
Figure 20B:
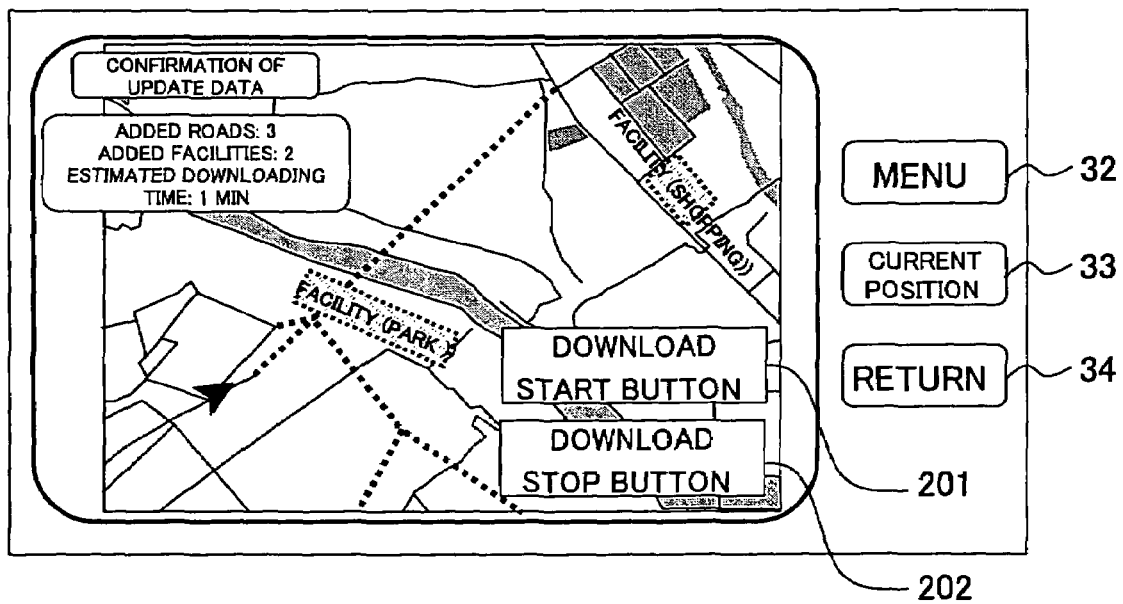
FIG. 20B shows an outline update map data display screen according to the embodiment.

If in step S1204, the update mode is not "no update" (No in S1204), whether or not the update mode is "update after outline display" is checked (S1207). If the update mode is "update after outline display" (Yes in S1207), an outline update map is downloaded from map updating server 4 (S1208) and the downloaded outline update map is displayed on display unit 31 (S1209). During downloading of the outline update map, a screen such as shown in FIG. 20A is displayed to indicate that a "difference update search is in progress." Also, for display of the outline update map, a screen such as shown in FIG. 20B is displayed to enable the user to check the update data. That is, outline shapes of roads are indicated by approximate dotted lines and facilities are indicated by rectangles. Also, as shown at an upper left portion of the screen, the number of roads added, the number of facilities added, and the estimated download time of the detailed data are displayed. Furthermore, a download start button 201 for starting the downloading of the detailed data and a download stop button 202 for interrupting the download are displayed.

When the download start button 201 is depressed (Yes in S1210), a detailed update map is downloaded (S1212) and the downloaded detailed update map is displayed on display unit 31 (S1213). During the download of the detailed update map, a screen such as that shown in FIG. 21A is displayed to indicate that "downloading of the newest map is in progress" and indicate the percentage of download accomplished. Also for display of the detailed update map, a screen such as shown in FIG. 21B is displayed, wherein roads and facilities are shown in detailed shapes close to the actual shapes. A map updating process of performing update registration of the detailed update map displayed on display unit 31 is then performed (S1214). This map updating process is mainly carried out by difference-in-map updating unit 23. Specifically, difference-in-map updating unit 23 first inputs the difference map data, which terminal communication unit 21 has downloaded from map updating server 4 via communication line 5 and difference update map format interpretation unit 22 has analyzed in accordance with the difference map data format. Difference-in-map updating unit 23 then updates, via terminal DB management unit 24, map DB 251, POI DB 252, or update record DB 256 in accordance with the contents of the difference map data that have been input. After completion of the map updating process, the added roads are displayed as solid lines on display unit 31 as shown in FIG. 21C. Also, when the user touches "☐Park" on display unit 31 with a finger, that the destination search data have been updated is indicated by a dialogue balloon display. The newly updated portions can thus be made apparent.

If in step S1210, download start button 201 has not been depressed (No in S1210), the depressing of download stop button 202 is checked (S1211). If download stop button 202 was depressed (Yes in S1211), the difference updating process is ended. If download stop button 202 has not been depressed (No in S1211), the process returns to step S1209. This means that in the display screen of the outline update map shown in FIG. 20B, as long as a button (201 or 202) concerning downloading is not depressed, the display of the outline update map is continued, and when a button concerning downloading is depressed, the process corresponding to that button is carried out.

If in step S1207, the update mode is not "update after outline display" (No in S1207), the detailed update map is downloaded (S1215). According to the update mode setting menu shown in FIG. 19, if the update mode is neither "no update" nor "update after outline display," the update mode will be "update after detailed display" or "update without checking." If the update mode is "update without checking" (Yes in S1216), the map updating process is performed (S1214). If the update mode is not "update without checking," that is, if it is "update after detailed display" (No in S1216), the downloaded detailed update map is displayed on display unit 31 as shown in FIG. 21B (S1217). Here the user can select whether or not to perform the map updating process by depressing either an update button 211 or a no update button 212. When menu control unit 275 detects the depressing of update button 211 (Yes in S1218), it makes difference-in-map updating unit 23 perform the map updating process (S1214). If update button 211 is not depressed within a predetermined time (No in S1218), the difference updating process ends.

Though with the difference updating operations of the vehicle-mounted terminal that are in accordance with the flowchart of FIG. 12, a case where roads and POI's are added was described, a case where roads are eliminated or changed shall now be described supplementarily.

Figure 22A:
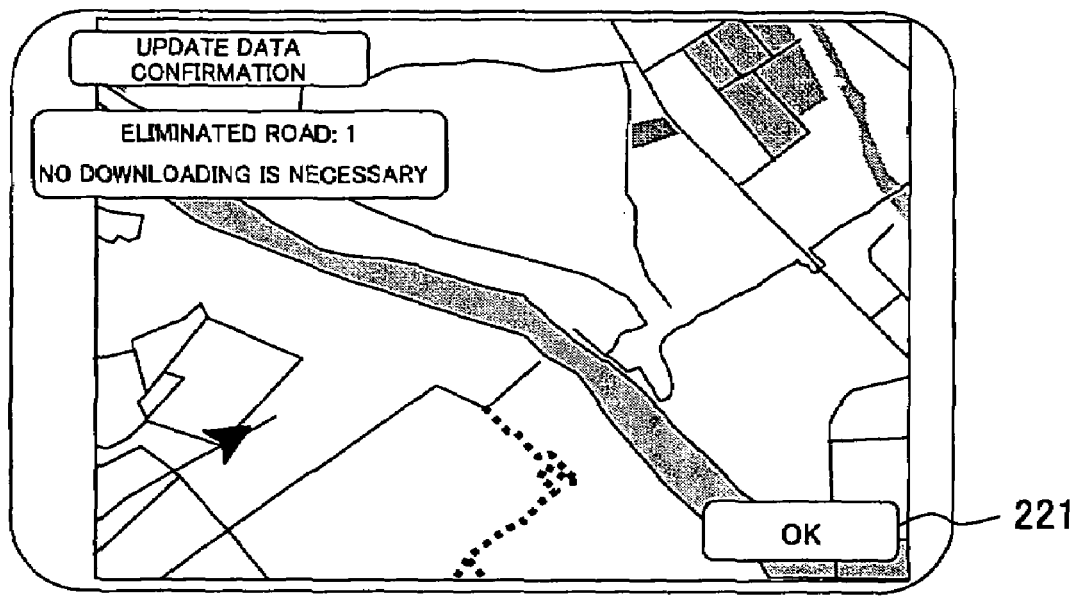
FIG. 22A shows an outline update map data display screen (the road that is eliminated) according to the embodiment.
Figure 22B:
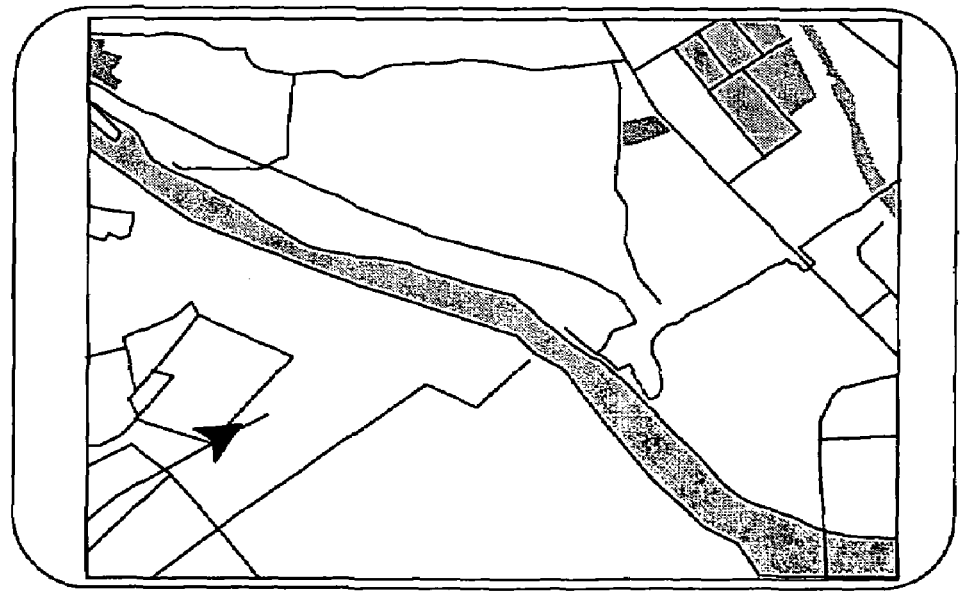
FIG. 22B shows an actual detailed update map data display screen according to the embodiment.

A case where a road is eliminated shall now be described with reference to FIG. 22. As shown in FIG. 22A, a road that will be eliminated is indicated by dotted lines at a lower central portion of the screen. This is an outline update map display that shows, for example, that the road indicated at the lower central portion of the screen of FIG. 20A will be eliminated. In this case, since, as the update data, there is just one road to be eliminated and there is no need to perform downloading from map updating server 4, the map updating process does not require time and cost. Thus only an OK button 221 is displayed regardless of the intention (of updating or not updating) of the user and the map updating process is performed when the user depresses OK button 221. The state wherein the road has been eliminated is then displayed as shown in FIG. 22B.

Figure 23A:
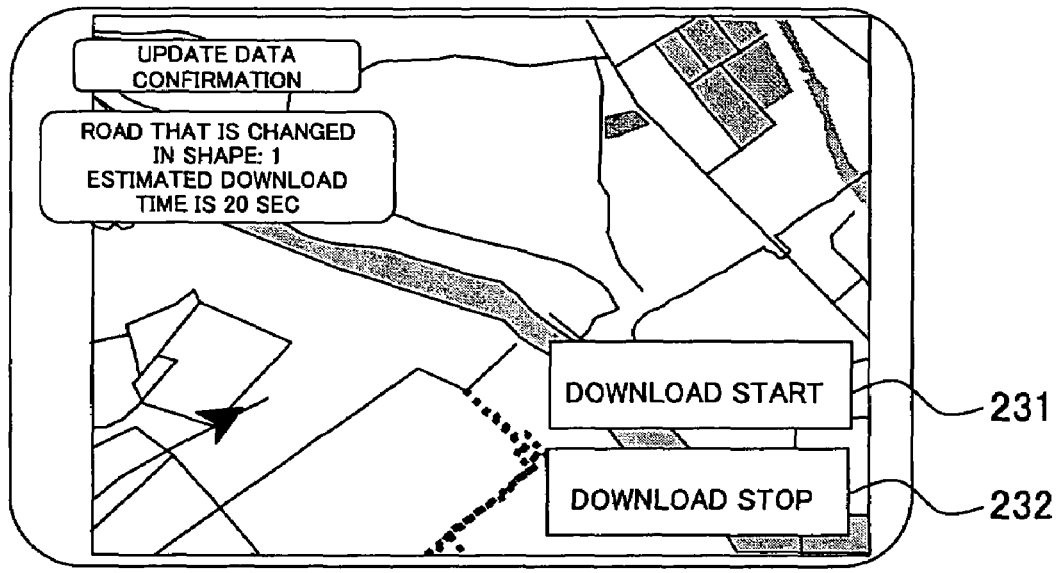
FIG. 23A shows an outline update map data display screen (the road that is changed) according to the embodiment.
Figure 23B:
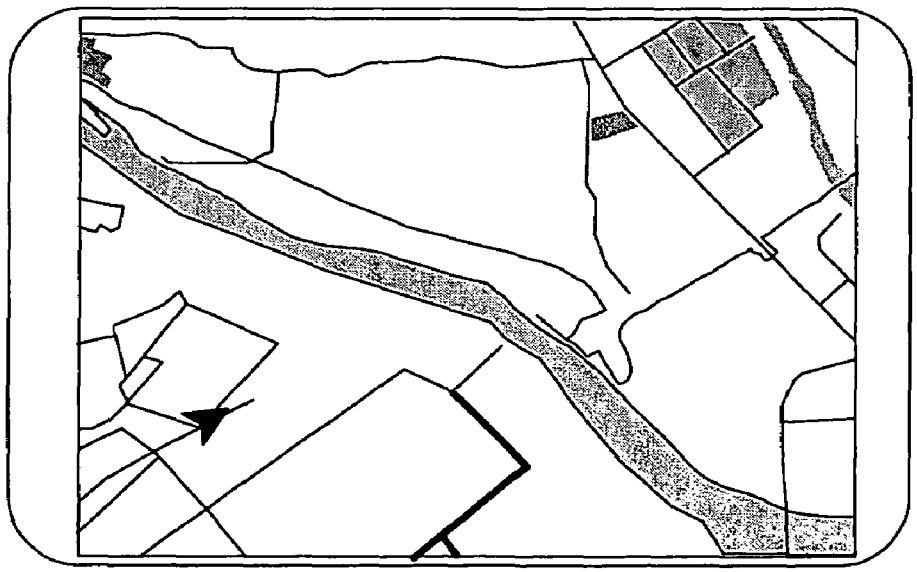
FIG. 23B shows an actual update map data display screen.

A case where a road is changed shall now be described with reference to FIG. 23A and FIG. 23B. As shown in FIG. 23A, a road prior to change and a road after change are indicated by dotted lines at a lower central portion of the screen. This is an outline update map display that indicates, for example, that a road displayed by solid lines at the lower central portion of the screen of FIG. 20A (prior to change) is changed to a road displayed by solid lines at the lower central portion of the screen of FIG. 23B (after change). Here, for the road prior to change, the detailed data are displayed, and for the road after change, the outline data are displayed. Since the states prior to and after change cannot be distinguished readily when the road prior to change and the road after change overlap, the respective roads may be displayed in different colors. As the update data, there is one road that is changed in shape, and the estimated download time from map updating server 4, a download start button 231, a download stop button 232, etc., are displayed. Here, when the user depresses download start button 231, the detailed data of the road after change are displayed by dotted lines and when the map updating process is carried out, the detailed data of the road after change become displayed by solid lines as shown in FIG. 23B.

<Destination Setting Operations of the Vehicle-Mounted Terminal>

Figure 13:
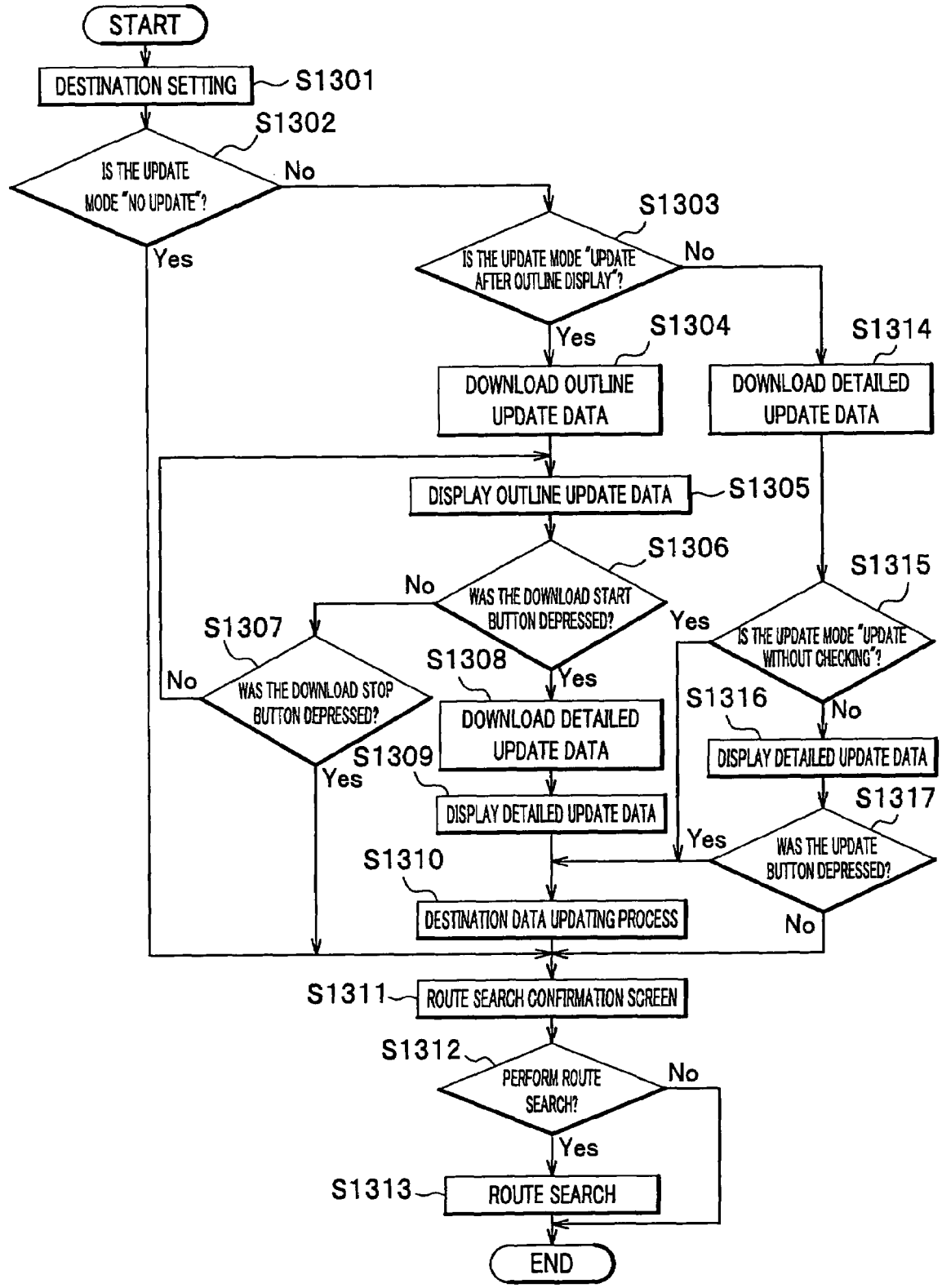
FIG. 13 is a flowchart illustrating a destination setting process of the vehicle-mounted terminal according to the embodiment.

FIG. 13 shows the destination setting operations of the vehicle-mounted terminal. Step S1117 of FIG. 11 are hereby illustrated in detail and the operations comprise a destination setting process, a set destination data display and updating process, and a process of searching the route from the current position to a destination.

The destination setting process is the process that is carried out in step S1301 and is started when destination setting button 161 is depressed in the car navigation menu of FIG. 16 (Yes in S1116). Specifically, menu control unit 275 makes a destination setting menu, shown in FIG. 24A, be displayed on display unit 31. A vicinity search button 241, a genre button 242, and an address search button 243 are displayed in the destination setting menu. Vicinity search button 241 is a button for selecting a category to be searched along the route from the current position to the destination. The details thereof shall be described separately. Genre search button 242 is a button with which the destination is set according to a POI genre (POI category data). Address search button 243 is a button with which the destination is set according to an address.

Figure 24A:
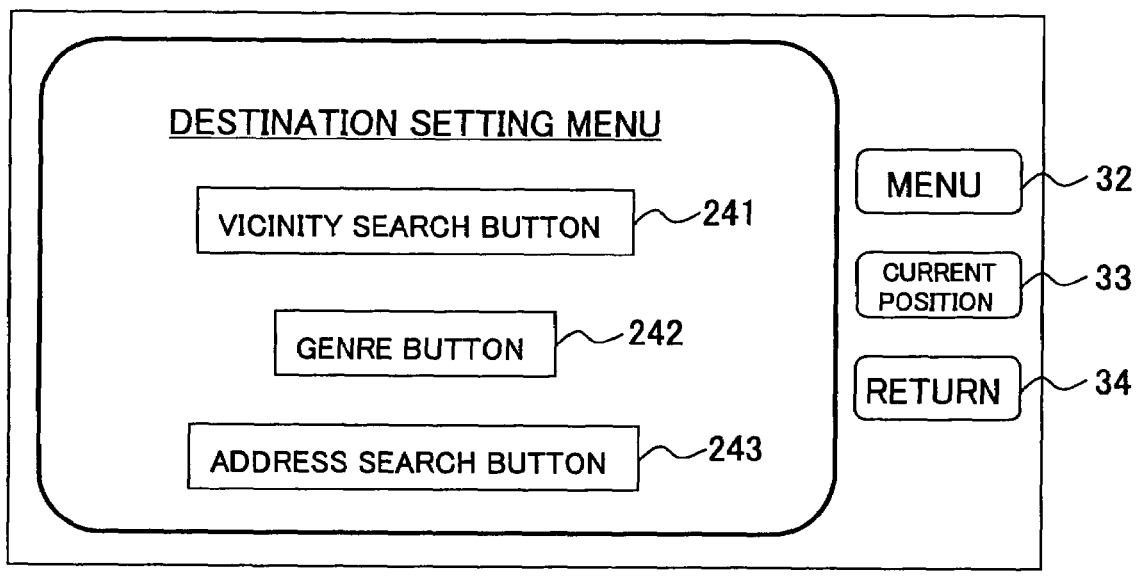
FIG. 24A shows a destination setting menu according to the embodiment.
Figure 24B:
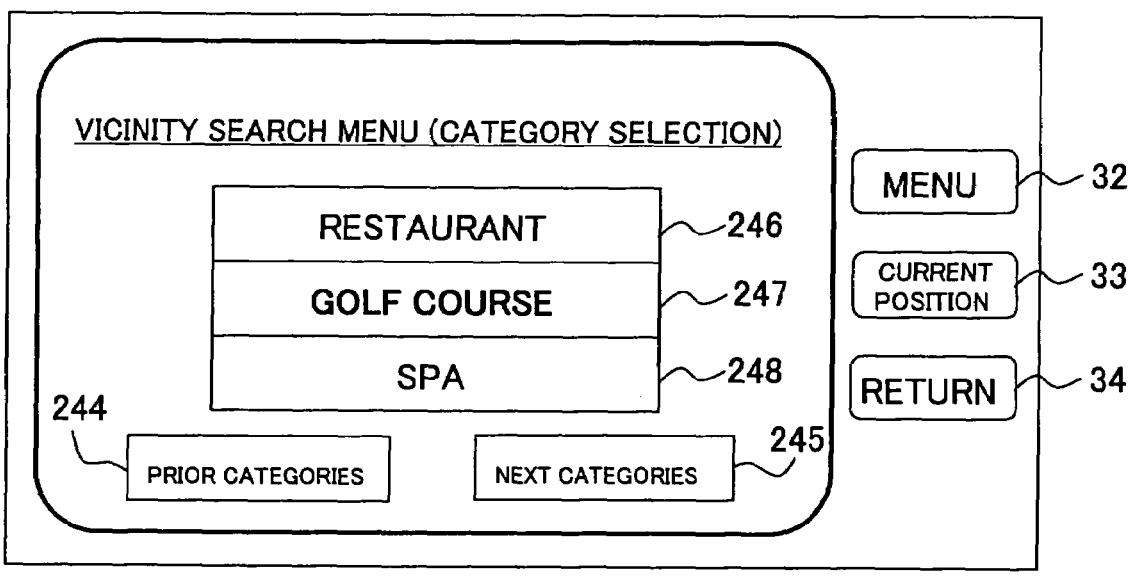
FIG. 24B shows a vicinity search menu (category selection) according to the embodiment.
Figure 25A:
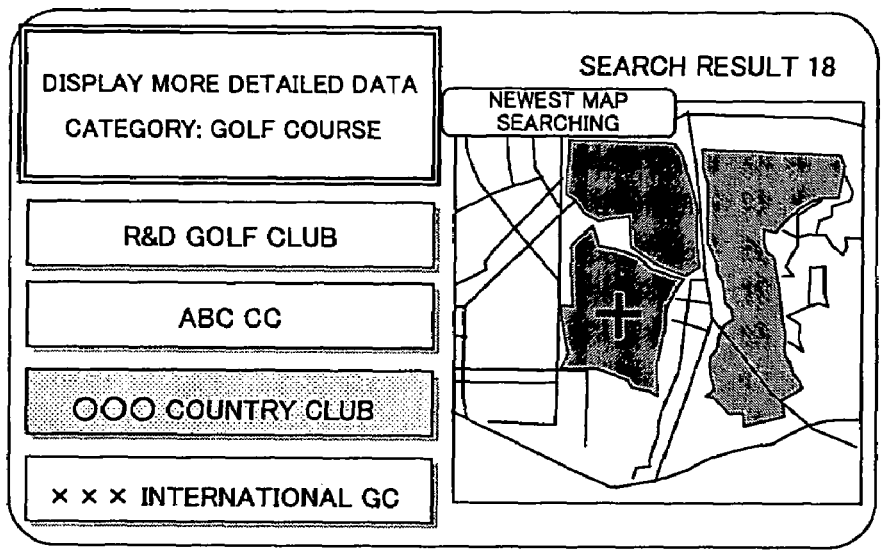
FIG. 25A shows a map display of the vicinity of a destination target and an update request according to the embodiment.

When vicinity search button 241 is depressed, a vicinity search menu, which is shown in FIG. 24B, is displayed. A prior categories button 244 and a next categories button 245 are displayed in the vicinity search menu, and by depressing one of these buttons (244, 245), the vicinity search menu is scrolled forward or backward. Here, a restaurant button 246, a golf course button 247, and a spa button 248 are displayed in the vicinity search menu. When golf course button 247 is depressed, a map of the vicinity of a destination candidate is displayed on display unit 31 as shown in FIG. 25A. On display unit 31 shown in FIG. 25A, four search results of the golf course category are displayed at the left side and a map of the "□□□ Country Club" is displayed at the right side. The map of the "□□□ Country Club" is displayed by depressing of "□□□ Country Club" among the search results at the left side.

Figure 25B:
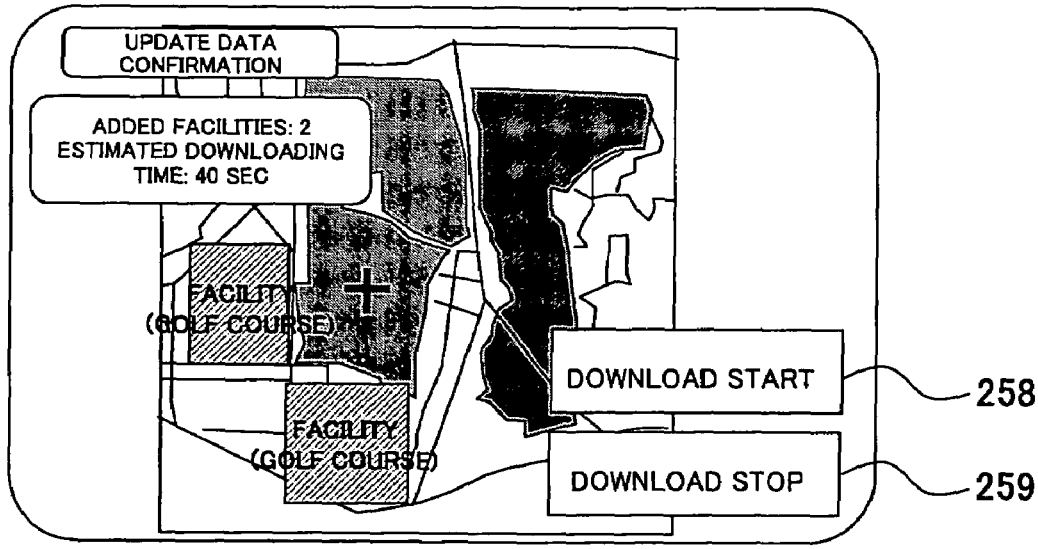
FIG. 25B shows an outline display of the newest data according to the embodiment.

The destination data display and updating process is the process that is carried out in steps S1302 to S1310 and S1314 to S1317. Since in this process, the display and updating of the data of the destination are carried out by applying the same process as those of steps S1204 to S1218 of FIG. 12 on the map data (POI data) of the destination displayed on display unit 31, detailed description of this process shall be omitted. The display of outline update data of step S1305 is carried out as shown in FIG. 25B.

<Difference Data Sending Operations (Based on an Initial Request) by the Map Updating Server>

Figure 14:
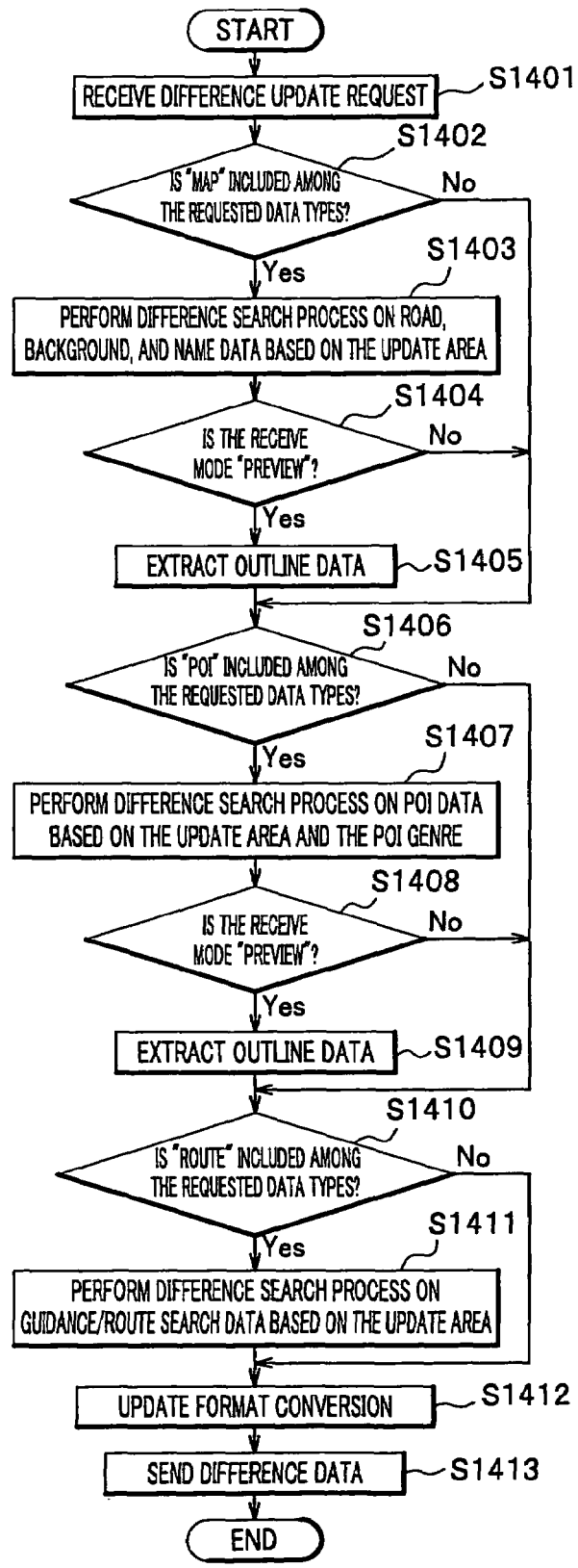
FIG. 14 is a flowchart illustrating a difference data sending process (based on an initial request) according to the embodiment.

FIG. 14 illustrates difference data sending operations performed by the map updating server. These operations are carried out mainly at difference-in-map search unit 42 of map updating server 4 and are particularly performed in response to an initial request from vehicle-mounted terminal 2. The initial request refers to a request in which a difference data ID is not designated. First, difference-in-map search unit 42 receives, via communication line 5 and server communication unit 41, a difference update request (first request message) from vehicle-mounted terminal 2 (S1401). Whether or not "MAP" is included among the requested data types of the received difference update request is then checked (S1402). Specifically, whether or not the data, "MAP," sandwiched by <Type> and </Type>, exists among the XML data of the difference update request is checked. If "MAP" is included (Yes in S1204), a difference search process of the road, background, and name data is performed based on the update area of the difference update request (S1403). Specifically, if differences of road, background, and name data exist in the range designated by the data sandwiched between <Area> and </Area> among the XML data of the difference update request, these differences are searched by a DB search function. Whether or not the receive mode of the difference update request is "Preview" is then checked (S1404). Specifically, whether or not the data "Preview," sandwiched by <Mode> and </Mode>, exists among the XML data of the difference update request is checked. If the receive mode is "Preview" (Yes in S1404), difference-in-map search unit 42 extracts outline data from the searched data differences (S1405). Here, if the outline data exist already, there is no need to perform the extraction. If "MAP" is not included (No in S1402) or the receive mode is not "Preview" (No in S1404), the process of S1406 is entered.

Whether or not "POI" is included among the requested data types of the received difference update request is then checked (S1406). Specifically, whether or not the data "POI," sandwiched by <Type> and </Type>, exists among the XML data of the difference update request is checked. If "POI" is included (Yes in S1406), a POI data difference search process is performed based on the update area and the POI genre of the difference update request (S1407). Specifically, if differences of POI data, belonging to the genre designated by the data sandwiched between <POI> and </POI> among the XML data of the difference update request, exist in the range designated by the data sandwiched between <Area> and </Area>, these differences are searched by the DB search function. Then if the receive mode of the difference update request is "Preview" (Yes in S1408), difference-in-map search unit 42 extracts outline data from the searched POI data differences (S1409). Here, if the outline data exist already, there is no need to perform the extraction. If "POI" is not included (No in S1406) or the receive mode is not "Preview" (No in S1408), the process of step S1410 is entered.

Whether or not "ROUTE" is included among the requested data types of the received difference update request is then checked (S1410). Specifically, whether or not the data "ROUTE," sandwiched by <Type> and </Type>, exists among the XML data of the difference update request is checked. If "ROUTE" is included (Yes in S1410), a guidance/route search data difference search process is performed based on the update area of the difference update request (S1411). Specifically, if differences of guidance/route search data exist in the range designated by the data sandwiched between <Area> and </Area> among the XML data of the difference update request, these differences are searched by the DB search function. If "ROUTE" is not included (No in S1410) the guidance/route search data difference search process is not performed.

Difference updating map format conversion unit 45 performs an update format conversion on the difference data and the guidance/route search data differences extracted in the above to the XML format or binary format for data communication (S1412). The difference data that have been format converted are then sent via server communication unit 41 and communication line 5 to vehicle-mounted terminal 2 (S1413). In this process, the difference data are sent with the difference data ID, which is the number unique to the difference data, being included. This difference data ID becomes effective information for the period during which the difference data that were searched by the respective different search processes are held in a predetermined cache memory.

<Difference Data Sending Operations (Based on Difference Data ID) by the Map Updating Server>

Figure 15:
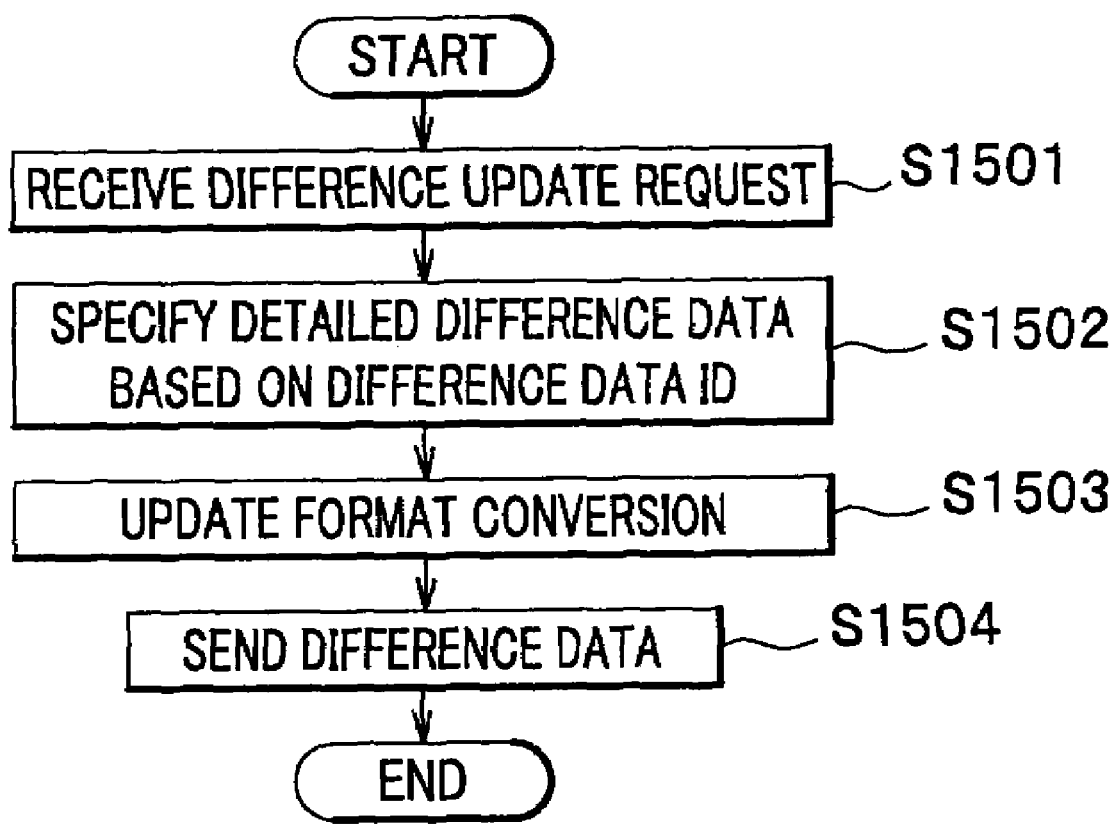
FIG. 15 is a flowchart illustrating a difference data sending process (based on a difference data ID) according to the embodiment.

FIG. 15 illustrates difference data sending operations performed by the map updating server. These operations are carried out mainly at difference-in-map search unit 42 of map updating server 4 and are particularly performed in response to a request based on difference data ID from vehicle-mounted terminal 2. When after receiving outline difference data once, the corresponding detailed difference data are to be received, vehicle-mounted terminal 2 designates the difference data ID at the point of receiving the outline difference data and requests the detailed difference data corresponding to the difference data ID by means of this request based on the difference data ID.

First, difference-in-map search unit 42 receives a difference update request (second request message) from vehicle-mounted terminal 2 via communication line 5 and server communication unit 41 (S1501). If a difference data ID is designated in the difference update request that is received, the detailed difference data is specified by the difference data ID (S1502). Specifically, the difference data with the difference data ID are searched from the difference data set held in a predetermined cache memory. An update format conversion is then performed on the specified detailed difference data (S1503). Furthermore, the format converted detailed difference data are sent to vehicle-mounted terminal 2 (S1504).

With a request based on difference data ID, if the difference data ID is invalid at map updating server 4, the same operations as those based on the initial request is carried out. That is, map updating server 4 requests vehicle-mounted terminal 2 to issue an initial request that does not designate a difference data ID and operates upon receiving this initial request.

Figure 2:
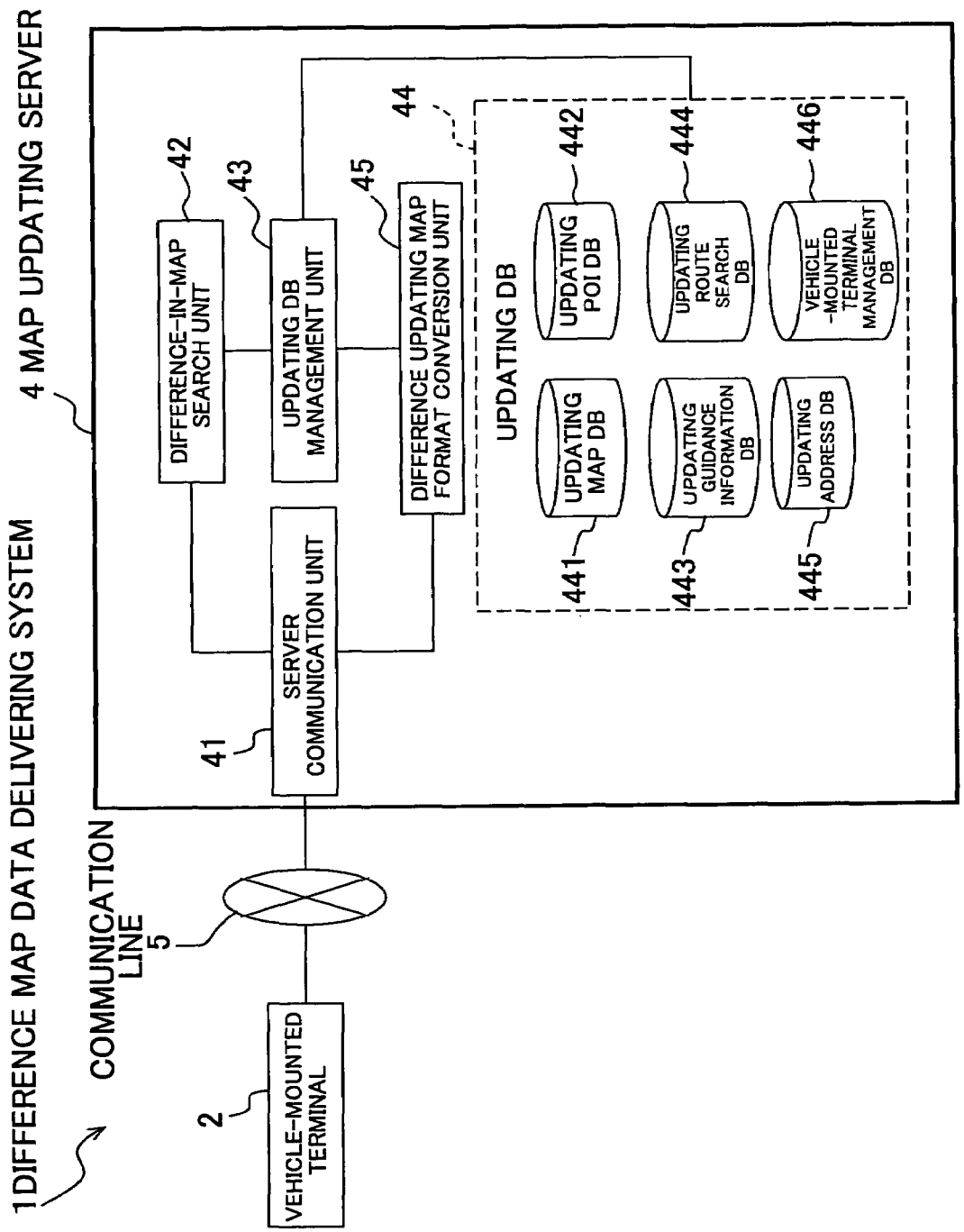
FIG. 2 is a block diagram showing the arrangement of the map data delivering system and map updating server of the embodiment.

An embodiment of this invention was described above, and the vehicle-mounted terminal and map updating server according to the embodiment are deemed to be realized by recording programs that are respectively executed by vehicle-mounted terminal 2 and map updating server 4, shown in FIG. 1 and FIG. 2, in computer readable recording media and making computer systems read and execute the programs recorded in these recording media.

Though an example of a preferred embodiment of this invention was described above, this invention is not restricted to the above-described embodiment and suitable changes can be made within a range that does not fall outside the gist of this invention. For example, the following embodiments are possible.

(1) Though with the above-described embodiment, it was described that among the objects on a map, roads, backgrounds, and names were arranged together (in MAP) as a subject (request data type) to be updated, arrangements may be made to designate each of these objects individually. In such a case, arrangements are made to enable XML tag data to be set according to roads, backgrounds, and names, respectively. By doing so, the outline of the update contents of each individual map data can be made known without having to download detailed difference data.

(2) Though with the above-described embodiment, it was described that when detailed difference data are requested in regard to outline difference data that are displayed on display 3 of vehicle-mounted terminal 2, the entirety of the difference data is requested by the difference data ID, arrangements may be made to designate each object to be displayed in detail. For example, arrangements may be made so that when the user touches display unit 31 with a finger, a detailed difference data request is sent upon designation of the type (road, background, name, or POI) of the object that was touched as shown in FIG. 20B.

More specifically, according to the present invention, the terminal sends to the server a first request message that specifies an area of a map to be subject to updating from the map data to the newest map data and requests outline difference data for displaying outlines of features at the specified area to be updated. The server receives the first request message and searching for the difference data corresponding to the area. The server extracts the outline difference data from the searched difference data. The server sends the extracted outline difference data to the terminal. The terminal receives the outline difference data and displaying the received outline difference data overlappingly on map data already displayed on a predetermined display unit.

For updating, at least one of names of features including a road and a background is specified, or a Point of Interest that indicates a request for sightseeing spots and any of various facilities is specified. When the Point of Interest is specified as the subjects of the updating, the genres (categories) of the Point of Interest are further specified to be transmitted in the first request message.

Further the terminal sends to the server a second request message that requests the difference data corresponding to the displayed outline difference data. The server receives the second request message and searching for the difference data corresponding to the displayed outline difference data. The server sends the searched difference data to the terminal. The terminal receives the difference data and on the predetermined display unit, erases the displayed outline difference data and displays the received difference data.

The invention claimed is:

1. A method of delivering map data in a system including a server, storing difference data between current map data and newest map data and a terminal, storing and displaying the map data, connected to the server through a network, wherein the server sends the difference data in response to a request from the terminal, the method comprising the steps of:
  (a) at the terminal, sending to the server a first request message that specifies an area of a map to be subject to updating from the current map data to the newest map data and requests outline difference data for displaying outlines of features to be updated at the specified area;
  (b) at the server, receiving the first request message and searching for the difference data corresponding to the area for displaying, in detail, the features to be updated;
  (c) at the server, extracting the outline difference data from the searched difference data;
  (d) at the server, sending the extracted outline difference data to the terminal; and
  (e) at the terminal, receiving the outline difference data and displaying the received outline difference data overlappingly on map data already displayed on a predetermined display unit.

2. The method according to claim 1, wherein the step (a) comprises the steps of specifying a part of the features to be updated to transmit the first request message by specifying at least one of a type of the features, a name of the features, and a Point of Interest that indicate a request for sightseeing spots and any of various facilities; and
  when the Point of Interest is specified as the subjects of the updating, further specifying a category of the Point of Interest.

3. The method according to claim 2, further comprising the step of, at the terminal, storing the received difference data in a predetermined storage unit.

4. The method according to claim 2, further comprising the steps of:

at the terminal, sending to the server a second request message that requests the difference data corresponding to the displayed outline difference data;

at the server, receiving the second request message and searching for the difference data corresponding to the displayed outline difference data;

at the server, sending the searched difference data to the terminal; and at the terminal, receiving the difference data and on the predetermined display unit, erasing the displayed outline difference data and displaying the received difference data.

5. The method according to claim 4, wherein in the step of sending the second request message to the server comprises the step of, at the terminal, specifying a type of the features to be displayed included in the difference data in detail.

6. The method according to claim 5, further comprising the step of, at the terminal, storing the received difference data in a predetermined storage unit.

7. The method according to claim 1, further comprising the steps of:

at the terminal, sending to the server a second request message that requests the difference data corresponding to the displayed outline difference data;

at the server, receiving the second request message and searching for the difference data corresponding to the displayed outline difference data;

at the server, sending the searched difference data to the terminal; and at the terminal, receiving the difference data and on the predetermined display unit, erasing the displayed outline difference data and displaying the received difference data.

8. The method according to claim 7, further comprising the step of, at the terminal, storing the received difference data in a predetermined storage unit.

9. The method according to claim 7, wherein in the step of sending the second request message to the server comprises the step of, at the terminal, specifying a type of the features to be displayed included in the difference data in detail.

10. The method according to claim 9, further comprising the step of, at the terminal, storing the received difference data in a predetermined storage unit.

11. The method according to any of claim 1, wherein the outline difference data of the futures include road data, comprising coordinates of a starting point, an end point, and points in between the starting point and the end point at each unit area.

12. The method according to any of claim 1, wherein the outline difference data of the features include POI data, comprising category names and representative coordinates.

* * * * *